United States Patent
Zinno et al.

(10) Patent No.: US 11,972,353 B2
(45) Date of Patent: Apr. 30, 2024

(54) CHARACTER CONTROLLERS USING MOTION VARIATIONAL AUTOENCODERS (MVAES)

(71) Applicant: Electronic Arts Inc., Redwood City, CA (US)

(72) Inventors: Fabio Zinno, Vancouver (CA); George Cheng, Burnaby (CA); Hung Yu Ling, Vancouver (CA); Michiel van de Panne, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 483 days.

(21) Appl. No.: 17/154,899

(22) Filed: Jan. 21, 2021

(65) Prior Publication Data
US 2021/0220739 A1    Jul. 22, 2021

Related U.S. Application Data

(60) Provisional application No. 62/964,526, filed on Jan. 22, 2020.

(51) Int. Cl.
*G06V 40/20* (2022.01)
*G06N 3/0455* (2023.01)
(Continued)

(52) U.S. Cl.
CPC ........... *G06N 3/088* (2013.01); *G06N 3/0455* (2023.01); *G06T 7/55* (2017.01); *G06T 7/70* (2017.01);
(Continued)

(58) Field of Classification Search
None
See application file for complete search history.

(56) References Cited

U.S. PATENT DOCUMENTS

| 5,274,801 A | 12/1993 | Gordon |
|---|---|---|
| 5,548,798 A | 8/1996 | King |

(Continued)

FOREIGN PATENT DOCUMENTS

| CN | 102509272 A | 6/2012 |
|---|---|---|
| CN | 103546736 A | 1/2014 |

(Continued)

OTHER PUBLICATIONS

R. P. Prager, L. Troost, S. Brüggenjürgen, D. Melhart, G. Yannakakis and M. Preuss, "An Experiment on Game Facet Combination\," 2019, 2019 IEEE Conference on Games (CoG), London, UK, pp. 1-8, https://ieeexplore.ieee.org/stamp/stamp.jsp?tp=&arnumber=8848073 (Year: 2019).*

(Continued)

*Primary Examiner* — Joni Hsu
(74) *Attorney, Agent, or Firm* — Knobbe, Martens, Olson & Bear, LLP

(57) ABSTRACT

Some embodiments herein can include methods and systems for predicting next poses of a character within a virtual gaming environment. The pose prediction system can identify a current pose of a character, generate a gaussian distribution representing a sample of likely poses based on the current pose, and apply the gaussian distribution to the decoder. The decoder can be trained to generate a predicted pose based on a gaussian distribution of likely poses. The system can then render the predicted next pose of the character within the three-dimensional virtual gaming environment. Advantageously, the pose prediction system can apply a decoder that does not include or use input motion capture data that was used to train the decoder.

18 Claims, 15 Drawing Sheets

(51) Int. Cl.
*G06N 3/088* (2023.01)
*G06T 7/55* (2017.01)
*G06T 7/70* (2017.01)
*G06T 13/40* (2011.01)

(52) U.S. Cl.
CPC .............. *G06T 13/40* (2013.01); *G06V 40/23* (2022.01); *G06T 2207/30196* (2013.01)

(56) References Cited

U.S. PATENT DOCUMENTS

| | | |
|---|---|---|
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,117,134 B1 | 8/2015 | Geiss et al. |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,858,700 B2 | 1/2018 | Rose et al. |
| 9,947,123 B1 | 4/2018 | Green |
| 9,984,658 B2 | 5/2018 | Bonnier et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,198,845 B1 | 2/2019 | Bhat et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,565,731 B1* | 2/2020 | Reddy .................... G06F 3/012 |
| 10,726,611 B1 | 7/2020 | Court |
| 10,733,765 B2 | 8/2020 | Andreev |
| 10,755,466 B2 | 8/2020 | Chamdani et al. |
| 10,792,566 B1 | 10/2020 | Schmid |
| 10,860,838 B1 | 12/2020 | Elahie et al. |
| 10,878,540 B1 | 12/2020 | Stevens |
| 10,902,618 B2 | 1/2021 | Payne et al. |
| 11,017,560 B1* | 5/2021 | Gafni .................... G06N 3/045 |
| 2002/0054054 A1 | 5/2002 | Sanbe |
| 2002/0089504 A1 | 7/2002 | Merrick et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0149516 A1 | 7/2006 | Bond et al. |
| 2006/0217945 A1 | 9/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0277497 A1 | 11/2010 | Dong et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0269540 A1 | 11/2011 | Gillo et al. |
| 2011/0292055 A1 | 12/2011 | Hodgins et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0303343 A1 | 11/2012 | Sugiyama et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0271458 A1* | 10/2013 | Andriluka .............. G06V 40/23 345/619 |
| 2013/0311885 A1 | 11/2013 | Wang et al. |
| 2014/0002463 A1 | 1/2014 | Kautzman et al. |
| 2014/0198106 A1 | 7/2014 | Sumner et al. |
| 2014/0198107 A1 | 7/2014 | Thomaszewski et al. |
| 2014/0327694 A1 | 11/2014 | Cao et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0071470 A1 | 3/2016 | Kim et al. |
| 2016/0217723 A1 | 7/2016 | Kim et al. |
| 2016/0307369 A1 | 10/2016 | Freedman et al. |
| 2016/0314617 A1 | 10/2016 | Forster et al. |
| 2016/0354693 A1 | 12/2016 | Yan et al. |
| 2017/0301310 A1 | 10/2017 | Bonnier et al. |
| 2017/0301316 A1 | 10/2017 | Farell |
| 2018/0043257 A1 | 2/2018 | Stevens |
| 2018/0122125 A1 | 5/2018 | Brewster |
| 2018/0165864 A1 | 6/2018 | Jin et al. |
| 2018/0211102 A1 | 7/2018 | Alsmadi |
| 2019/0139264 A1 | 5/2019 | Andreev |
| 2019/0392587 A1 | 12/2019 | Nowozin et al. |
| 2020/0294299 A1 | 9/2020 | Rigiroli et al. |
| 2020/0394806 A1 | 12/2020 | Payne et al. |
| 2021/0019916 A1 | 1/2021 | Andreev |
| 2021/0125036 A1* | 4/2021 | Tremblay ............. G06V 10/242 |
| 2021/0192357 A1* | 6/2021 | Sinha .................... G06N 3/084 |

FOREIGN PATENT DOCUMENTS

| CN | 105405380 A | 3/2016 |
|---|---|---|
| CN | 105825778 A | 8/2016 |

OTHER PUBLICATIONS

Anagnostopoulos et al., "Intelligent modification for the daltonization process", International Conference on Computer Vision Pub-

(56) References Cited

OTHER PUBLICATIONS lished in 2007 by Applied Computer Science Group of digitized paintings.
Andersson, S., Goransson, J.: Virtual Texturing with WebGL. Master's thesis, Chalmers University of Technology, Gothenburg, Sweden (2012).
Avenali, Adam, "Color Vision Deficiency and Video Games", The Savannah College of Art and Design, Mar. 2013.
Badlani et al., "A Novel Technique for Modification of Images for Deuteranopic Viewers", May 2016.
Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Blanz V, Vetter T. A morphable model for the synthesis of 3D faces. In Proceedings of the 26th annual conference on Computer graphics and interactive techniques Jul. 1, 1999 (pp. 187-194). ACM Press/ Addison-Wesley Publishing Co.
Blanz et al., "Reanimating Faces in Images and Video" Sep. 2003, vol. 22, No. 3, pp. 641-650, 10 pages.
Chao et al., "A Simple Geometric Model for Elastic Deformations", 2010, 6 pgs.
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Dudash, Bryan. "Skinned instancing." NVidia white paper(2007).
Fikkan, Eirik. Incremental loading of terrain textures. MS thesis. Institutt for datateknikk og informasjonsvitenskap, 2013.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Habibie et al., "A Recurrent Variational Autoencoder for Human Motion Synthesis", 2017, in 12 pages.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Han et al., "On-line Real-time Physics-based Predictive Motion Control with Balance Recovery," Eurographics, vol. 33(2), 2014, 10 pages.
Hernandez, Benjamin, et al. "Simulating and visualizing real-time crowds on GPU clusters." Computación y Sistemas 18.4 (2014): 651-664.
Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.
Hu Gousheng, Face Analysis using 3D Morphable Models, Ph.D. Thesis, University of Surrey, Apr. 2015, pp. 1-112.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
Mcadams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", Dec. 2011, in 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.

(56) References Cited

OTHER PUBLICATIONS

Treuille, A. et al., "Near-optimal Character Animation with Continuous Control", University of Washington, 2007, 7 pgs.

Ulicny, Branislav, and Daniel Thalmann. "Crowd simulation for interactive virtual environments and VR training systems." Computer Animation and Simulation 2001 (2001): 163-170.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Vigueras, Guillermo, et al. "A distributed visualization system for crowd simulations." Integrated Computer-Aided Engineering 18.4 (2011): 349-363.

Wu et al., "Goal-Directed Stepping with Momentum Control," Eurographics/ ACM SIGGRAPH Symposium on Computer Animation, 2010, 6 pages.

\* cited by examiner

CHARACTER CONTROLLERS USING MOTION VARIATIONAL AUTOENCODERS (MVAES)

INCORPORATION BY REFERENCE TO ANY PRIORITY APPLICATIONS

This application claims priority to U.S. Provisional Application No. 62/964,526, filed on Jan. 22, 2020 and titled "CHARACTER CONTROLLERS USING MOTION VAES," which is hereby incorporated herein by reference in its entirety.

BACKGROUND

Video games have featured three-dimensional (3D) poses of characters since the earliest 3D graphics. In order to create poses of characters, developers manually create predetermined poses. In some instances, the process can be improved by receiving a desired destination input from the user, and the gaming system can retrieve from predetermined poses that have been created and stored ahead of time. However, the developers must manually create these poses and the poses cannot be created in real time. There is a need to effectively and efficiently enable game developers to develop a system that can generate next pose predictions in real time of game play without having to individually retrieve predetermined poses of characters or store motion capture data.

SUMMARY OF THE EMBODIMENTS

The systems, methods, and devices of this disclosure each have several innovative aspects, no single one of which is solely responsible for the all of the desirable attributes disclosed herein.

One embodiment discloses a method for predicting a next pose of a character within a three-dimensional virtual gaming environment, wherein the method includes: identifying a current pose of a character within a three-dimensional virtual environment of a game application; generating a gaussian distribution data representing a sample of likely poses over a gaussian distribution based on the current pose; applying the gaussian distribution data to a decoder, the decoder trained to generate a predicted next pose;
  receiving, from the decoder, the predicted next pose; and
    rendering the predicted next pose of a character within the three-dimensional virtual gaming environment.

In some embodiments, the predicted next pose is generated by the decoder without using input motion capture data that was applied during training of the decoder.

In some embodiments, during use of the decoder to receive the predicted next pose, input motion capture data used to train the decoder is not stored in memory.

In some embodiments, input to the decoder does not include root motion path, wherein root motion path includes a trajectory of the character in a first time period and a second time period.

In some embodiments, the method further comprises identifying an environmental characteristic within a three-dimensional virtual environment, the environmental characteristic includes a goal for the character, wherein the decoder is trained to generate a predicted next pose for the goal.

In some embodiments, the goal is an end location of the character.

In some embodiments, the goal is a desired trajectory of the character.

In some embodiments, the environmental characteristic is inputted into the decoder for receiving the predicted next pose.

In some embodiments, environmental characteristics are not used in training the decoder.

In some embodiments, the gaming application includes a maze runner.

In some embodiments, the predicted next pose comprises pose data including at least one of: joint angles of the character, trajectory information, or joint rotation information.

In some embodiments, the gaussian distribution comprises a mean and standard deviation.

In some embodiments, applying the gaussian distribution comprises sampling the gaussian distribution to determine a latent variable.

In some embodiments, the sample of likely poses comprise a sample of valid poses from the current pose of the character.

One embodiment discloses a system for training a decoder to predict a next pose of a character within a three-dimensional virtual gaming environment, wherein the system includes: one memory; and one or more processors configured to: input, to an encoder, a current pose and a next pose from motion capture data; receive, from the encoder, a gaussian distribution representing likely next poses from the current pose; input, to a decoder, the gaussian distribution and the next pose; receive, from the decoder, a predicted next pose; compare the next pose with the predicted next pose to generate a loss function; and apply a reward function based on the comparison of the actual next pose with the predicted next pose to perform reinforcement learning to train the decoder to predict next poses of characters in a virtual gaming environment based on a current pose and an environmental characteristic.

In some embodiments, the dimensionality of the output of the encoder is the same as the input of the decoder.

In some embodiments, the dimensionality is a 32 long latent variable.

In some embodiments, the environmental characteristic includes a goal for the character, wherein the decoder is trained to generate a predicted next pose for the goal.

In some embodiments, the predicted next pose is generated by the decoder without using input motion capture data that was applied during training of the decoder.

In some embodiments, during use of the decoder to receive the predicted next pose, input motion capture data used to train the decoder is not stored in memory.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1A:
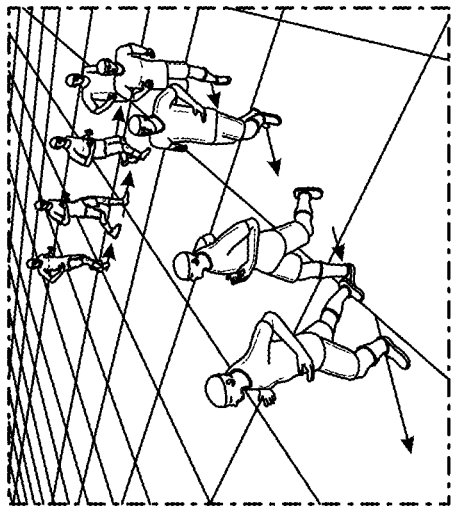
FIGS. 1A-1D illustrate embodiments of predicted next poses one frame at a time using an autoregressive conditional variational autoencoder.
Figure 1B:
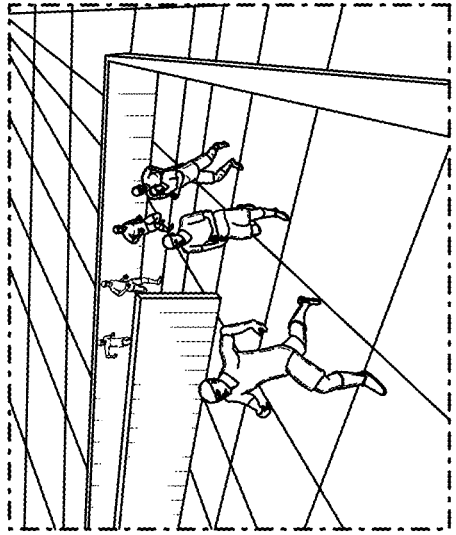
Figure 1C:
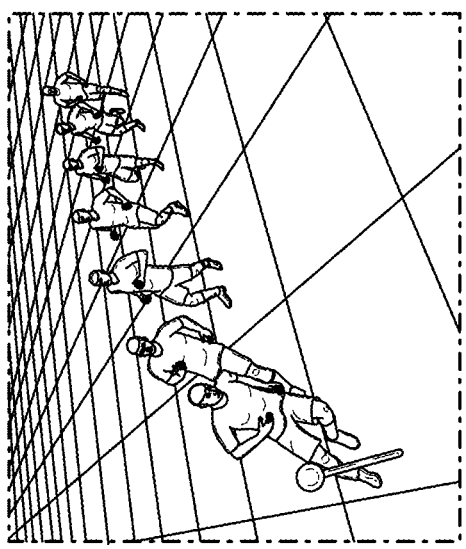
Figure 1D:
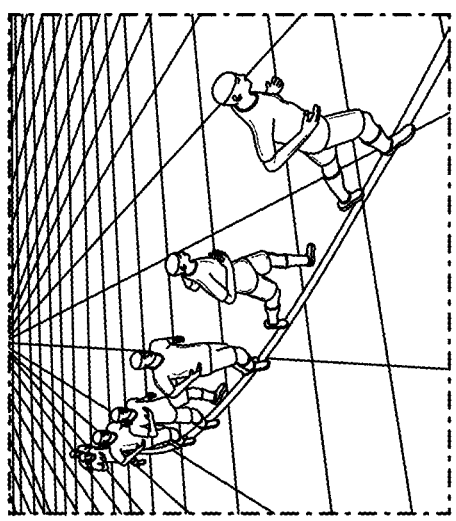

A fundamental problem in computer animation is that of realizing purposeful and realistic human movement given a sufficiently-rich set of motion capture clips. One problem is the creation of high level automation controllers that have signals that specify certain goals, such as a direction of movement, the speed of movement, an end goal destination, and the like. The control signal can be a joystick input that requests a character object to move in a certain direction or can include a final destination where the user would like the character to move to.

One approach is to use information about the current pose, in the form of joint positions and velocities, and search a database that contains all the character poses in a corpus of motion capture data for the most similar pose; after the best candidate is found, the next frame in the original animation clip is presented as the next frame at runtime. The problem with this approach is not having control of how the virtual character moves. The poses can be a smooth animation, but in a random direction and location, which can result problematic animations and poses.

To achieve control, we can extract additional information about the task that the character needs to perform, concatenate it with the character pose information, and perform again a search on a database. For a task like locomotion, the system can extract a past and future trajectory of the character (e.g., a trajectory one second in the past and a trajectory one second in the future). The trajectory information, together with the current pose, can be used to identify the best next pose prediction. This approach is practical but the right features for the task must be manually chosen, and tasks other than locomotion are hard to encode. Furthermore, the original animation data needs to be stored and accessed in memory.

Deep Learning can be used to replace the database search, having a neural network output directly the next character pose. Using a neural network solves the problem of having to store the animation data in memory. However, since the input to the neural network is still a combination of character pose and trajectory information, the same limitations of motion matching apply, meaning that tasks other than locomotion can be hard to express.

Reinforcement learning can be used to remove this limitation. With reinforcement learning, the system does not have to program explicitly what the animation controller has to display for the character at each time frame (e.g., each pose at these time frames), but rather provides high level task information and redefines the model using reward signals. For example, if the predicted pose for the next time frame brings the character closer to the task at hand, then the system can provide positive reinforcement.

Simple reinforcement learning techniques, such as Value or Policy Iteration, can be used to create a locomotion controller: animation data is compiled into a field of high dimensional points (i.e. the character poses), and an algorithm such as Value Iteration can be used to find a policy that navigates this field to achieve a high level goal. One issue with this approach is that the runtime policy is simply choosing what animation pose to play next at each frame, hence still using the animation data that was used in the training process, which must be stored and accessed in memory. Moreover, the output of methods like Value Iteration is a batch of tables that requires a large amount of memory, and thus is not very efficient.

Deep Reinforcement Learning can be used to overcome this, by approximating the policy and Value Function with a neural networks. Now the learned policy, instead of returning the index of the candidate next pose in the database, outputs directly the character pose. This means that the action space for the character pose is continuous and has high dimensionality. For example, a single joint can take a different angle configuration for the next pose, and those angles are not discrete values but continuous. Thus, the neural network will need to be able to generalize all of the continuous space in the virtual environment which can require very large input and output nodes for the full pose of the character. Thus, traditional systems have not been able to create a practical solution using reinforcement learning with neural networks to predict future poses.

There is a need to produce high-quality motion, have an algorithm that is compact in memory size and efficient to run at runtime, and support a variety of goal-directed behaviors. In particular, there is a need to predict future poses using both reinforcement learning and deep neural networks without having to store actual motion capture clip data in memory that was used in the reinforcement learning process.

Some embodiments of the present disclosure disclose a two-step approach to reinforcement learning and neural networks to predict future poses. First, the system learns a kinematic generative model of human motion given example motion data. The system can apply an autoregressive conditional variational autoencoder, also referred to herein as a motion VAE (MVAE). Given the current character pose, the MVAE can predict the pose at the next time step. Importantly, the model can produce a distribution of next-state predictions because the model is also conditioned on a set of stochastic latent variables—each sampling of these variables corresponds to a different future feasible next-state prediction. The model is autoregressive, meaning that the current predicted pose becomes the current character pose for the following prediction.

A trained MVAE can be controlled to generate desired motions in several ways. The simplest is to randomly sample from the next-state predictions at each time-step, which produces a random walk through the learned dynamics of the MVAE. More interestingly, the stochastic variables that govern the next-state predictions as the action space can be treated as a reinforcement learning problem, which was not possible for learning approaches based purely on supervised learning. Given a reward function that defines the goals of the character, the system can learn a control policy which uses this action space to guide the generative model in accordance with those goals.

VAEs have been identified as a potential class of models for kinematic motion generation, along with recurrent neural networks (RNNs). However, the stable generation of long motion sequences is commonly acknowledged as a significant and unresolved challenge, as are issues of motion quality. Embodiments herein apply MVAEs to produce high-quality results with fully skinned characters and with no additional foot-skate cleanup. Further, unlike previous approaches using a memory enabled RNN architecture, embodiments herein illustrate that the MVAE can work well in a memoryless fashion, e.g., conditioned only on the previous pose (which includes velocities). The MVAE decoder architecture plays an important role with regards to motion quality and stability. The present disclosure provides insights with respect to generalization and over-fitting, as well as documenting other remaining limitations of the MVAE architecture. Importantly, the present disclosure shows the usability of MVAEs and demonstrates how an energy penalty can be used to better model human motion preferences.

Embodiments of the present disclosure learn data-driven generative models of human movement using autoregressive conditional variational autoencoders, or Motion VAEs. The latent variables of the learned autoencoder define the action space for the movement and thereby govern its evolution over time. Planning or control algorithms can then use this action space to generate desired motions. In particular, embodiments of the present disclosure use deep reinforcement learning to learn controllers that achieve goal-directed movements. The system can demonstrate the effectiveness of the approach on multiple tasks. The present disclosure further evaluates system-design choices and describe the current limitations of Motion VAEs.

FIGS. 1A-1D illustrate embodiments of predicted next poses one frame at a time using an autoregressive conditional variational autoencoder model. A variety of task specific control policies can be learned on top of this model. Embodiments of the present disclosure include a generative VAE motion model, the MVAE, capable of producing stable high-quality human motions. The present disclosure documents embodiments of the key algorithmic and architectural features that can be applied to implement the MVAE. The present disclosure describes how reinforcement learning can effectively use the MVAE generative model to produce compact control policies. These can then be coupled with the MVAE model to produce desired goal-directed movement.

Motion VAEs

Embodiments of the present disclosure include an autoregressive conditional variational autoencoder, or Motion VAE (MVAE), that is trained using supervised learning with motion capture data. The MVAE implicitly models a distribution of possible next poses. To sample from this distribution, samples are drawn from the normally distributed latent variables, which are then passed through the MVAE decoder in order to realize a next-pose estimate. Importantly, the MVAE is controllable via the choice of sample in the latent space of the learned autoencoder. This will serve as the action space for the planner or control policy, to be described later. The MVAE consists of an encoder and a decoder, and these two modules work cooperatively to model natural motion transitions. The encoder compresses high dimensional pose transition information into a compact latent representation. The decoder takes this latent representation of the motion, as well as a condition pose, to generate the next pose.

Embodiments of the present disclosure include a system configured to first compute the root position of the character by projecting the hip joint position onto the ground. Similarly, the root facing direction is the ground projection of the forward-facing axis of the hip joint. The root position and facing direction are used to compute the character's linear and angular velocities. The joint positions and velocities are expressed in the character's root space. Joint orientations are represented using their forward and upward vectors, which avoids the problems of angle-based representations, in the character space.

Figure 2A:
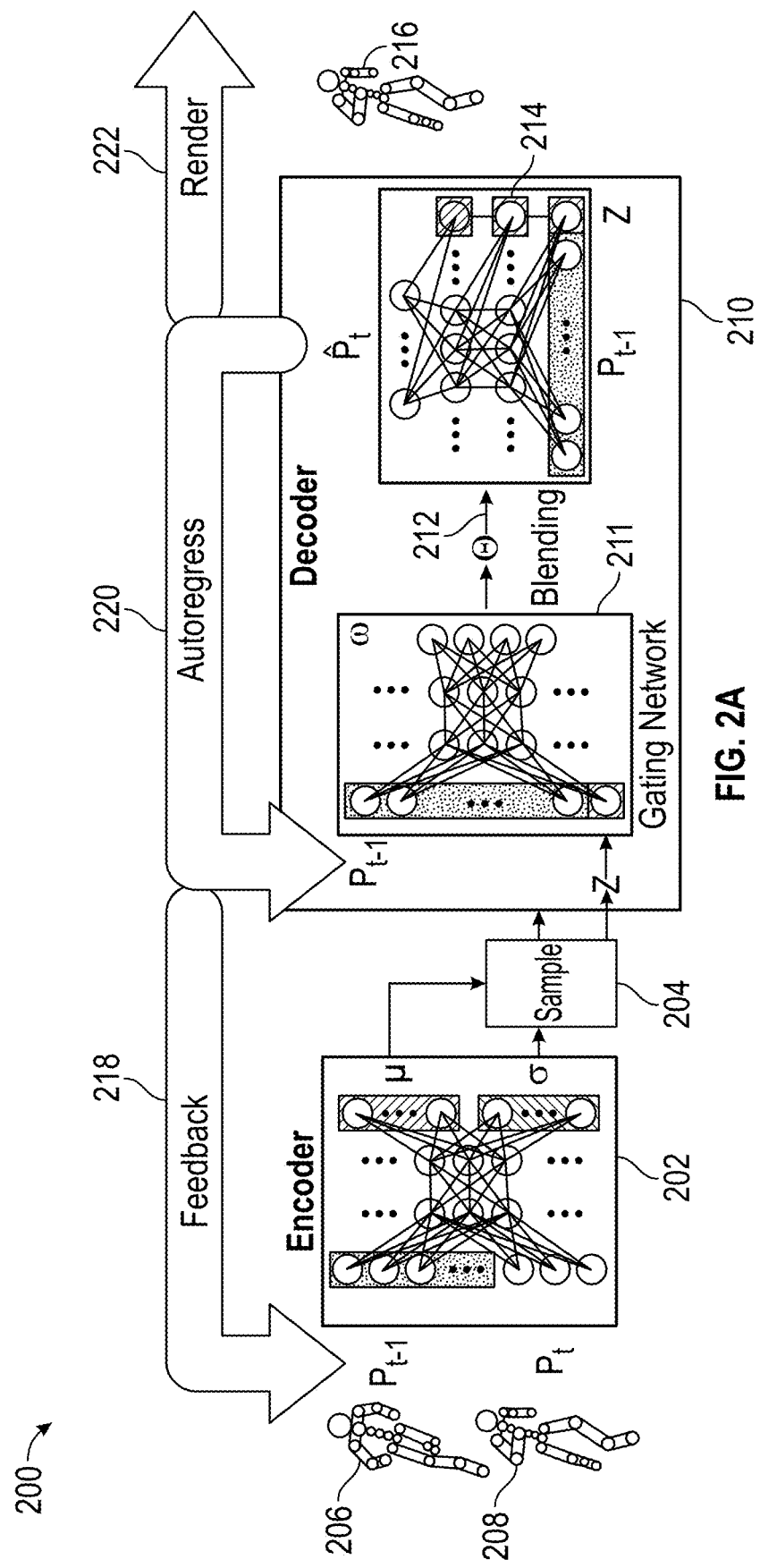
FIG. 2A illustrates a block diagram illustrating an embodiment of an encoder and decoder network.

Embodiments of the present disclosure use the MVAE to generate a distribution of possible next poses given the previous pose. During training, the MVAE reconstructs the next pose given the current pose, while trying to shape the latent variable z into the standard normal distribution, as shown in FIG. 2A (described further below). The reconstruction loss is defined as the mean squared error (MSE) between the predicted pose and the next frame observed in the motion clip. At run-time, the encoder is discarded, and the decoder is used to predict future poses, one at a time, in an autoregressive fashion. More precisely, given an initial pose, e.g., randomly selected from the motion database, a sample is drawn from the latent variable z. This sample, together with the current pose, is used by the decoder to generate the next pose, which is then fed back into the decoder for the following pose, and this process repeats ad infinitum.

Figure 2B:
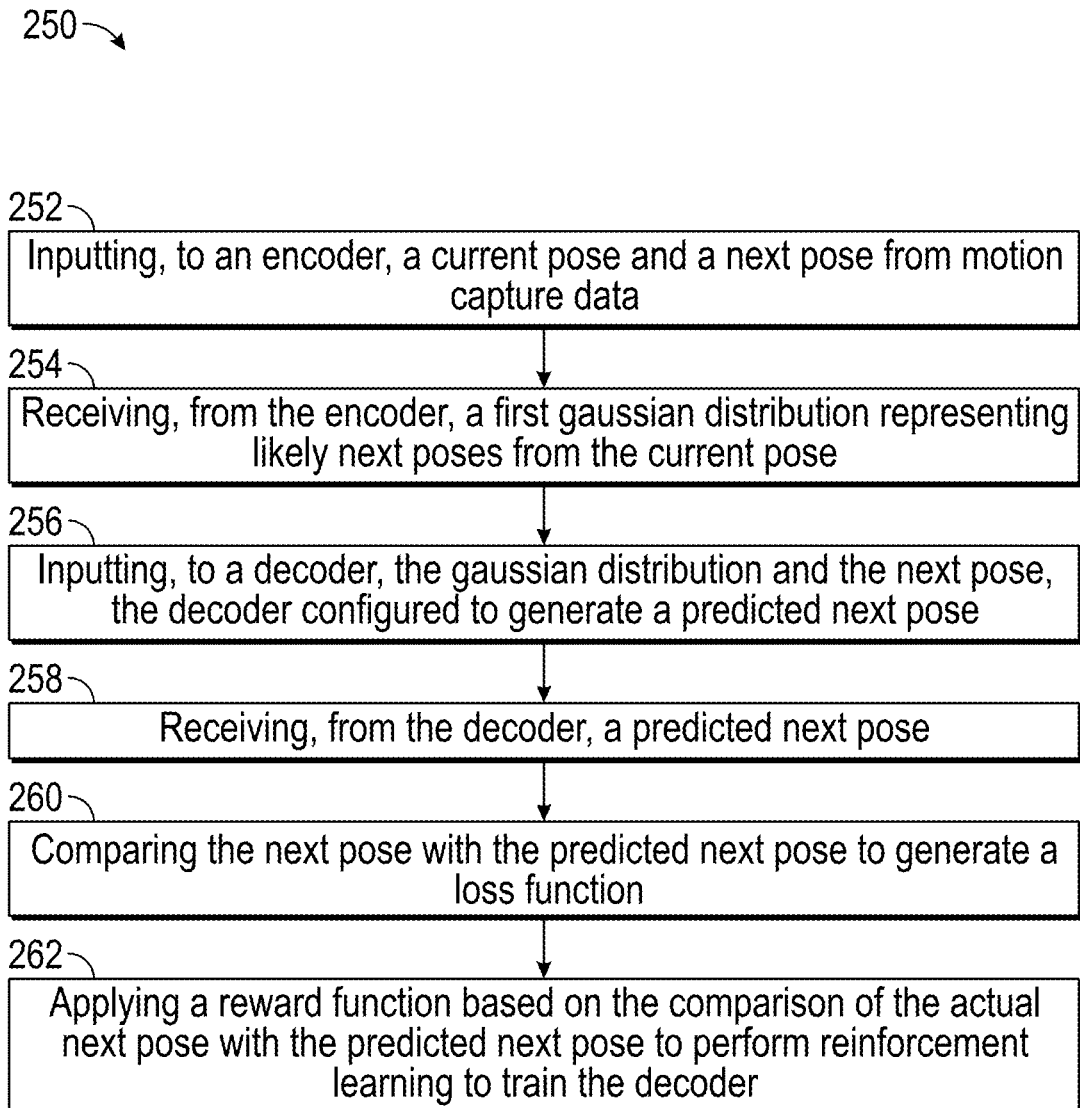
FIG. 2B illustrates a flowchart of an embodiment in the decoder training process.

FIG. 2A illustrates a block diagram 200 illustrating an embodiment of an encoder and decoder network. The block diagram 200 includes an encoder network 202 and a decoder network 210. FIG. 2B illustrates a flowchart of a process 250 in the decoder training process. The process 250 can be implemented by any system that can train a decoder for predicting a next pose within a game application in a network-based game environment. For example, the process 250, in whole or in part, can be implemented by a pose prediction system, or other computing system. Although any number of systems, in whole or in part, can implement the process 250, to simplify discussion, the process 250 will be described with respect to particular systems. Further, although embodiments of the process 250 may be performed with respect to variations of systems comprising various game application environments, to simplify discussion, the process 250 will be described with respect to a pose prediction system.

Encoder Network

In some embodiments, the encoder network 202 includes a three-layer feed-forward neural network that encodes the previous pose $p_{t-1}$ 206 and current pose $p_t$ 208 into a latent vector z. For example, step 252 can include inputting, to an encoder, a current pose and a next pose from motion capture data. Each internal layer can include 256 hidden units followed by Exponential Linear Unit (ELU) activations. The output layer can include two outputs, $\mu$ and $\sigma$, required for the reparameterization used to train variational autoencoders, as further described below. For example, step 254 can include receiving, from the encoder, a first gaussian distribution representing likely next poses from the current pose. In some embodiments, the latent dimension is 32, which approximates the degrees of freedom of typical physics-based humanoids. As such, the training stability and reconstructed motion quality is not overly sensitive to the encoder structure and latent dimension size.

In some embodiments, operational encoders are used to take a corpus of motion capture data and train the operational encoder with the data. The operational encoder can include a model that is trained on reconstructing the regional data and also learning the distribution of that data. The operational encoder can output gaussian noise to input into the decoder. As such, the decoder can predict a pose that is a pose in the actual dataset. The dimensionality of the gaussian noise can be the same or as big as the bottleneck between the encoder and the decoder. Thus, the operational encoder is trained to output a distribution of likely next poses from input data of a current pose and a previous pose to determine likely next poses over a distribution. The gaussian distribution can be sampled 204 to determine a latent variable z which is used by the decoder to reconstruct the predicted next pose. The latent variable z is the random sampling representation which is fed to the decoder. Thus, the encoder receives input of known pose data and outputs a distribution sample space of likely potential poses.

Decoder Network

In some embodiments, the decoder network 210 can include a mixture-of-expert (MoE) architecture. The decoder network can partition the problem space between a fixed number of neural network experts, with a gating network 211. The MoE architecture places constraints on what the next pose can be, and to make the pose more likely the actual next pose. The gating network 211 can decide how much to weight the prediction of each expert when computing a final output or prediction. The decoder network 210 can empirically observe to help achieve slightly better pose construction and reduced visual artifacts. The decoder network 210 can consist of six identically structured expert networks 214 and a single gating network 211 to blend the weights via blending 212 of each expert to define the decoder network to be used at the current time step. Similar to the encoder, the gating network can include a three-layer feed-forward neural network with hidden units followed by ELU activations.

In some embodiments, the input to the gating network can include the latent variable z and the previous pose $p_{t-1}$. For example, step 256 recites inputting, to a decoder, the gaussian distribution and the next pose, where the decoder is configured to generate a predicted next pose. Each expert network 214 can be similar to the encoder network in structure. These expert networks 214 can compute the current pose from the latent variable z, which encodes the pose transition, and the previous pose.

In some embodiments, an important feature of the expert network 214 is that z can be used as input to each layer to help prevent posterior collapse (discussed further below). Although a single pose can be used as a condition, the pose prediction system can use consecutive past posts. Using multiple frames as the condition can improve the reconstruction quality of the MVAE, but at the same time reduces the diversity of the output poses. In the worst case scenario, the decoder may learn to ignore the encoder output, also known as the posterior collapse, and cause the conditional VAE to only playback the original motion capture data. The pose prediction system can use one or two consecutive poses as the condition. In other embodiments, the pose prediction system can determine an optimal choice based on a function of diversity and quality of the motion database. To further prevent posterior collapse, the pose prediction system can pass the latent variable to every layer of the expert network, which can reduce the likelihood of posterior collapse happening (as will be further described herein). Other design decisions that impact the likelihood of posterior collapse include the decoder network size, the weight of the KL-divergence loss (in β-VAE), and the number of latent dimensions.

In some embodiments, the gating network can receive z as input only for the first layer. Then at step 258, the pose prediction system can receive, from the decoder, a predicted next pose.

Training the Pose Prediction System

In some embodiments, the pose prediction system is trained to provide the most likely next pose based on a current and past pose. The past pose can include different features of the character, such as joint positions, joint velocities, joint directions, etc. The features are added together into a vector that is fed into the encoder as a pose.

In some embodiments, during training, a control signal may not be needed. The pose prediction system can receive motion capture data and input the data into the encoder, such as described in step 252. For example, the pose prediction system can take the first frame and the second frame, and input the first and second frame into the encoder. The output of the decoder can be a predicted third frame. The pose prediction system can compare the predicted third frame from the decoder with the actual third frame in the motion capture data to generate a loss function, as will be described further herein.

The encoder can output a gaussian distribution of likely next poses, as described in step 254. The gaussian distribution output can include poses that are more likely and other poses that are less likely. The encoder can be trained to identify correct poses and provide a random sample of valid poses over a distribution. If the pose prediction system continues to draw poses from this distribution over an amount of time, the poses will become closer and closer to the original data set. The pose prediction system can sample random trajectories using this variational autoencoder, where the gaussian distribution output is a mathematical representation of the original pose data set. The output of the encoder is the bottle neck, which is of a much lower data resolution. This forces compression of the data into much smaller dimensions. For example, the dimensionality of the data can be compressed from 200 floating points as the input to 32 as the output of the encoder.

In some embodiments, the output gaussian distribution data is inputted into the decoder, as described in step 256. The pose prediction system can receive a predicted next pose 216 from the decoder, as described in step 258. As such, the decoder takes randomized gaussian noise to generate a random sample from the distribution of poses. The output of the decoder can include the predicted next pose 216 in a higher dimensionality of data, such as the same dimensionality as the input to the encoder. For example, the input current and previous poses 206, 208 and the output predicted next pose 216 can be of a 200 floating point dimensionality.

In some embodiments, the pose prediction system can apply control signals to control the gaussian distribution noise. The control signals can further define the pose that the decoder outputs from the sample distribution.

In some embodiments, the pose prediction system can compare the actual next pose that is in the motion capture data with the predicted next pose received from the decoder to generate a loss function, as described in step 260. In step 262, the pose prediction system can apply a reward function based on the comparison of the actual next pose with the predicted next pose. The reward function can be used to perform reinforcement learning to train the decoder. The reward function can include a positive or negative signal that indicates whether the predicted next pose is going in the right or wrong direction. As such, reinforcement learning can be used to figure out what this gaussian noise needs to be in order to get the desired poses. The pose prediction system can use reinforcement learning to randomly try different kinds of noises at very high speeds to perform repetitious training, e.g., millions of times. The reward function enables the reinforcement learning by encouraging predictions made that were close to the actual next pose, and negative reinforcement to predicted poses that were quite different.

In some embodiments, the pose prediction system can use different gaussian noises and apply the reward function based on whether the predicted pose takes the character toward or away from the goal. Advantageously over systems that solely use reinforcement learning without variational encoders, the number of random gaussian noises can be applied quickly.

Only applying a reinforcement learning algorithm (without variational encoders) would take an impractical amount of time to train, e.g., billions of years. The reason is that not only does high dimensionality of data require a lot of time, but there are many continuous variables, as further described herein (e.g., continuous joint positions and trajectories). For example, an only reinforcement learning approach could try to obtain a skeleton configuration to solve the task, but there are a large number of all of the possible skeleton configurations based on joint angles. Only a very small subset of these configurations are actual poses that a human being can realistically do, and the vast majority of these combinations are impractical and unrealistic. This was why traditional systems have been unsuccessful implementing pose prediction systems using reinforcement learning.

In the present disclosure, operational autoencoders solve this problem now that the pose prediction system can identify the noise that is fed into the decoder, where the gaussian distribution includes a mean and standard deviation of valid poses. The pose prediction system does not waste millions of attempts on pose configurations that do not resemble a potential pose for a human or other character (e.g., animal). With the use of an autoencoder, the pose prediction system can receive a predicted next pose from the decoder that is a valid pose. Advantageously, the pose prediction system is not wasting training time with invalid poses, and reducing the dimensionality of the input (e.g., 200 joints) to something much smaller for the neural network to implement.

In some embodiments, the next pose can be rendered on the game application 222, fed back as input to the decoder 218 and auto-regress to the decoder 220 for generating the next prediction.

Figure 3:
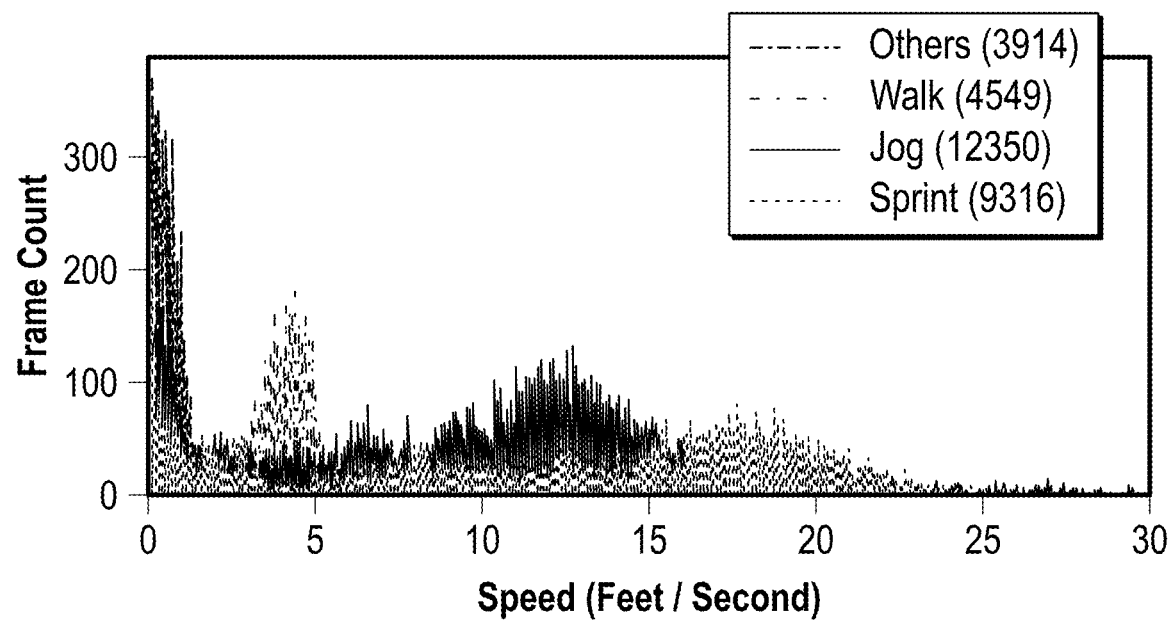
FIG. 3 illustrates a graph visualizing motion capture database clips for various activities based on frame count and speed.

In one example, the pose prediction system can receive 17 minutes of walking, running, turning, dynamic stopping, and resting motions. This can include the mirrored version of each trajectory. The data can be captured at 30 Hz and contains about 30,000 frames. The motion classification, e.g., walking and running, may not be used during training and there may be no further preprocessing, e.g., foot contact and gait-phase annotations are not required. FIG. 3 illustrates a graph visualizing motion capture database clips for various activities based on frame count and speed. The number of frames in each category is labeled in brackets. The Others category includes mostly non-locomotion motion clips, such as in-place turning or resting. The pose prediction system can implement a training procedure that follows that of a standard β-VAE. The objective is to minimize the reconstruction and KL-divergence losses. The pose prediction system can select $\beta=0.2$ to minimize the chance of posterior collapse. Because the learning stability is not sensitive to the exact value of β, the pose prediction system can generate better generalization when z-score normalization is applied to the training data. Intuitively, standardizing the input data reduces the bias caused by the motion range differences of each joint. The learning rate can be initialized at $10^{-4}$ and can be linearly decayed to zero over 180 epochs. With a mini-batch size of 64, the entire training procedure can take a few hours to complete.

A fundamental challenge of kinematic animation systems is the need to balance motion quality against generalization. In a non-parametric setting, this can be adjusted by tuning the number of nearest-neighbors and the distance threshold in the nearest neighbor search. In VAEs, the balance comes from weighting the reconstruction and KL-divergence losses. When motion quality is heavily favored, the system can replay the original motion capture sequences, and as a result, it will not respond effectively to user control. Conversely, when motion generalization is favored, the system may produce implausible poses and motions. A generative model that can generalize to all physically feasible motions must learn to infer the laws of Newtonian mechanics, which is difficult given limited training data. Therefore, when data is limited, the goal is to strike a balance between motion quality and generalization. The pose prediction system can optimize to have the MVAE reconstruction and KL-divergence losses be within one order of magnitude of each other at convergence as a good proxy for finding an appropriate balance between quality and generalization.

Scheduled Sampling

Figure 4:
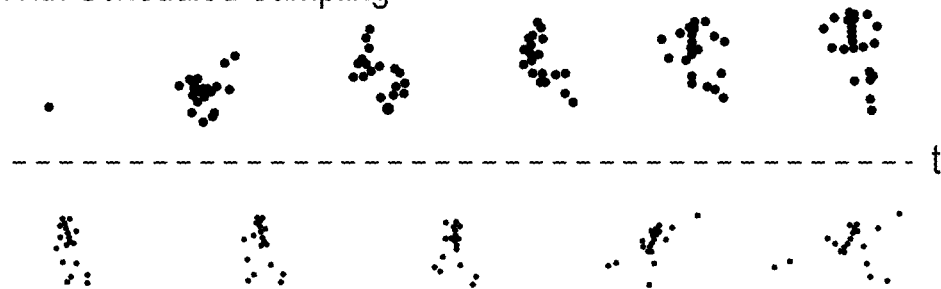
FIG. 4 illustrates the ability of the MVAE to recover after being trained using scheduled sampling to progressively introduce the run-time distribution during training.
Figure 5A:
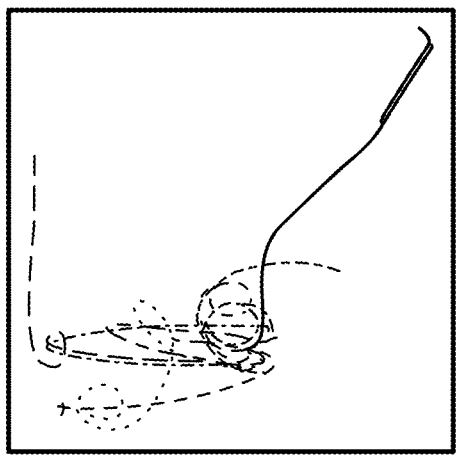
FIGS. 5A-5F illustrate random walks visualized for six different initial conditions.
Figure 5B:
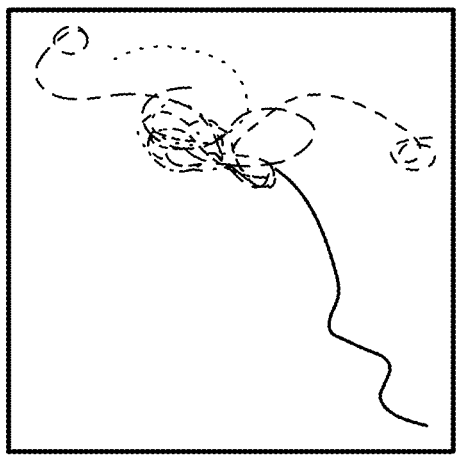
Figure 5C:
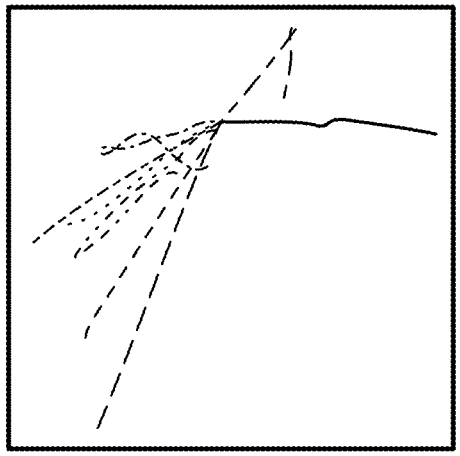
Figure 5D:
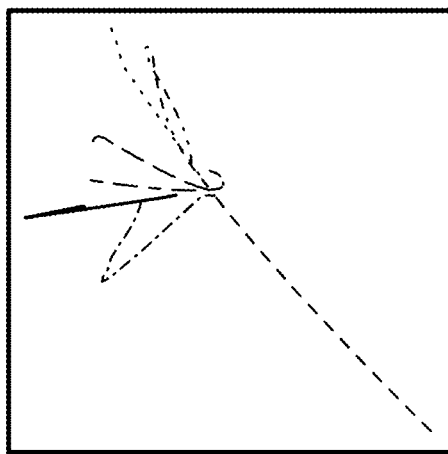
Figure 5E:
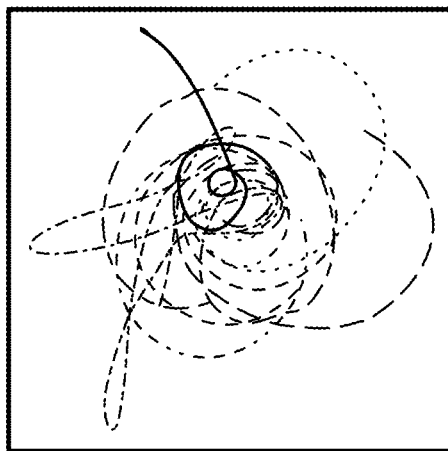
Figure 5F:
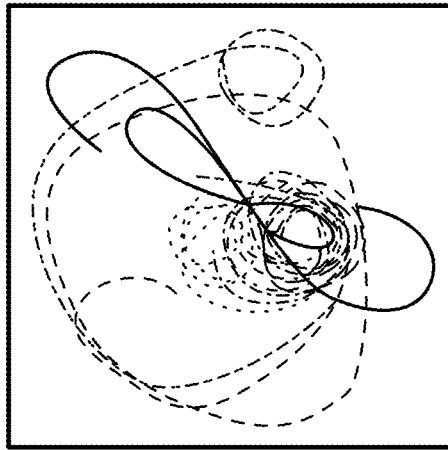

In some embodiments, the MVAE trained with standard supervised learning suffers from unstable predictions when making autoregressive predictions at run-time. This is due to growing reconstruction errors that can rapidly cause the MVAE to enter a new and unrecoverable region of the state space. The consequence is clear when visualizing the predicted poses, which no longer resemble a character body. To alleviate this, pose prediction system can use scheduled sampling to progressively introduce the run-time distribution during training. A sample probability p is defined for each training epoch. After a pose prediction is made, it is used as input for the next time step with probability 1−p, instead of using the pose from the ground truth training data. The entire training process can be divided into three modes: supervised learning (p=1), scheduled sampling (decaying p), and autoregressive prediction (p=0). The number of epochs for each mode is 20, 20, and 140 respectively. For the scheduled sampling mode, the sampling probability decays to zero in a linear fashion with each learning iteration. FIG. 4 illustrates the ability of the MVAE to recover after being trained using scheduled sampling to progressively introduce the run-time distribution during training.

FIG. 4 shows a comparison of MVAE reconstruction stability with and without scheduled sampling. The time axis flows from left to right. The top illustrates samples with scheduled sampling, where the MVAE is able to reconstruct the character body even when the initial joint locations are all clustered into a single point. The bottom illustrates pose reconstruction of MVAE trained without scheduled sampling with exactly the same settings for the same number of epochs. Even though the character is initialized to a motion capture frame, reconstruction error still quickly accumulates causing the joints to fly apart.

In some embodiments, in order to implement scheduled sampling, the pose prediction system needs to define a prediction length L for each roll-out, even though the pose prediction system may not use a recurrent neural network. In each roll-out, the pose prediction system can randomly sample a start frame from the motion capture database and perform pose prediction for L steps. Ideally, L should be large enough to allow prediction errors to accumulate, so as to simulate the actual run-time distribution. For example, the pose prediction system can apply training with L=8 (1 4 second) which can be enough to prevent covariate shift for motions. Another technical detail for doing mini-batched supervised learning is that to handle the end-of-clip problem. Since each frame sample needs L=8 subsequent frames, the pose prediction system can choose to only sample frames that meet this condition. The pose prediction system can cope with variable length inputs by padding the training sequences to match the length of the longest sequence, e.g., for sentence generation in natural language processing, where the end of input sentences is padded with end-of-sentence tokens. For the pose prediction system, padding would be inappropriate because, unlike sentences, the motion clips used do not have a definitive end pose. Since any frame can be treated as a start and end pose of a sequence, the motion clips can be freely divided into equal-length sequences. However, this assumption may not hold for some motions where the start and end poses need to be fixed, such as gymnastic movements.

Motion Synthesis

In some embodiments, the pose prediction system can use control signals based on the space of possible actions, as defined by samples from the latent encoded state z. Random sampling and sampling-based control strategies can be implemented.

In some embodiments, the pose prediction system can implement a random sampling-based control strategy. FIGS. 5A-5F illustrate random walks visualized for six different initial conditions. Each of the figures display eight characters initialized to the same initial condition, but unique latent variable samples are drawn at each time step for 300 steps. The resulting root trajectories are shown, with the original motion capture trajectory also shown in a thicker line for comparison.

Given an initial character state, the pose prediction system can simulate random plausible movements by using random samples from the MVAE latent distribution. Even with a single frame condition, the synthesized reconstructed motion can typically resemble that of the original motion clip from which the starting frame is chosen. For example, when the initial character state comes from the middle of a sprint cycle, the MVAE will continue to reconstruct the sprint cycle. Furthermore, when the initial state is a stationary pose, e.g., a common pose at the start of most motion clips, the character can transition into walking, running, jumping, and resting motions. FIG. 5 shows the effect of the conditioning on the reconstructed motion.

One challenge in kinematic animation is to know whether the underlying motion database is capable of a given desired motion. For instance, it may not be obvious when a data-driven animation system can transition between two motion clips. Often the pose prediction system might determine that two motion clips have close enough transition points upon visual inspection, but the actual distance in high-dimensional pose space may not match. In the random walk condition, the pose prediction system can be plainly observed when a particular motion is isolated in the pose space and therefore has no transition to other motions. When the random walk is unable to transition despite drawing many samples, the pose prediction system can determine that additional motion capture data, especially the transition motions, may need to be supplied. An advantage of using an MVAE model is that it is small enough, and therefore fast enough, for quick design iterations. The pose prediction system can use this method to find that the original motion capture database had an insufficient number of character turning examples.

In some embodiments, the pose prediction system can use a sampling-based control strategy. The pose prediction system can develop a simple sampling-based controller via multiple Monte Carlo roll-outs (N) for a fixed horizon (H). The first action of the best trajectory, among all sampled roll-outs, is selected and applied to the character for the current time step. This procedure is then repeated until the task is accomplished or terminated. As such, this simple sampling-based control method can work well for simple locomotion tasks. Using N=200 and H=4, the character can generally navigate towards and circle around the target, as well as adapting to sudden changes in the target location.

Learning Control Policies

In some embodiments, the pose prediction system can use a control policy to guide the character to perform various tasks using the latent samples z as an action space, as shown in FIG. 6 and described further herein. Unlike direct-prediction policies, a control policy can be learned in support of arbitrarily defined rewards that can be used to shape a behavior. The pose prediction system can flexibly handle a variety of task representations, such as, for example, target location, desired speed and direction, or working with local vision sensing capability.

In some embodiments, the pose prediction system can use deep reinforcement learning (DRL) to learn various loco-motion skills. At each time step t, the agent reacts to an environment state $s_t$ by performing an action $a_t$. Based on the action performed, the agent receives a reward signal $r_t$=r $s_t$, $a_t$ as feedback. The agent computes $a_t$ using a neural network policy $\pi_\theta$a s, where $\pi_\theta$a is the probability density of a under the current policy. The goal is to find the network parameters θ which maximize the following:

$$J_{RL}(\theta) = E\left[\sum_{t=0}^{\infty} \gamma^t r(s_t, a_t)\right].$$

Here, $\gamma \in [0, 1)$ is the discount factor so that the sum converges. The pose prediction system solves this optimization problem using the proximal policy optimization (PPO) algorithm.

In some embodiments, the control policy can include a two hidden-layer neural network with 256 hidden units followed by Rectified Linear Unit (ReLU) activations. The output layer can be normalized with Tanh activation and then scaled to be between −4 and +4. Since the policy outputs the latent variable, the scaling factor should be chosen according to the latent distribution. In the case of a CVAE, the latent distribution is assumed to be a normal distribution with zero mean and unit variance. With a scaling factor of 4, the majority of the probability mass of a standard normal distribution is covered. The value function network is identical to the policy network, with the exception of the normalization in the output layer.

In some embodiments, the convergence of the algorithms can be sensitive to hyper-parameter settings in general, but embodiments of the present disclose do not find that to be the case. The pose prediction system can use the same hyperparameters for every task. The learning rate decays exponentially following the equation: max (1, 3 $0.99^{iteration})\times10^{-5}$. Embodiments of the present disclosure find that decaying the learning rate exponentially helps to improve the training stability of the policy network. For collecting training data, the pose prediction system can run 100 parallel simulations until the episode terminates upon reaching the maximum time step defined for each task, typically 1000. The policy and value function networks are updated in mini-batches of 1000 samples. Since all computations are done on the GPU, the data collection and training processes are fast despite the large batch size. All tasks described in the following sections can be fully trained within one to six hours on a desktop machine.

In physics-based animation control, an energy or effort penalty is used to restrict the solution space such that the learned policy produces natural motions. Mechanical energy can be calculated from torque, since torque is already used as part of the physics simulation. In contrast, it can be difficult to define an energy term in kinematic animation, so root velocity is used as a proxy. In motion data, the root velocity metrics can often be inconsistent with intuition of physical effort when visually examining the motion. To accurately quantify effort, the pose prediction system can consider the motion of the joints as well; therefore, energy can be defined as follows:

$$E = (\dot{r}^x)^2 + (\dot{r}^y)^2 + (\dot{r}^a)^2 + \frac{1}{J}\sum_{j}^{J}\|\dot{j}^v\|^2.$$

A more accurate energy metric can include masses and inertia of each joint into consideration. When the pose prediction system can include the energy measure as a penalty in optimization, the policy can be able to find visibly lower effort solutions. In comparison to the common approach of using a target root velocity to regulate character energy expenditure, the pose prediction system's approach of optimizing for energy is more natural. In addition, since the target velocity does not need to be supplied by the user at run-time, the pose prediction system approach is also more flexible for animating non-directly controllable characters or large crowds.

Use of the Decoder at Run Time

Figure 6A:
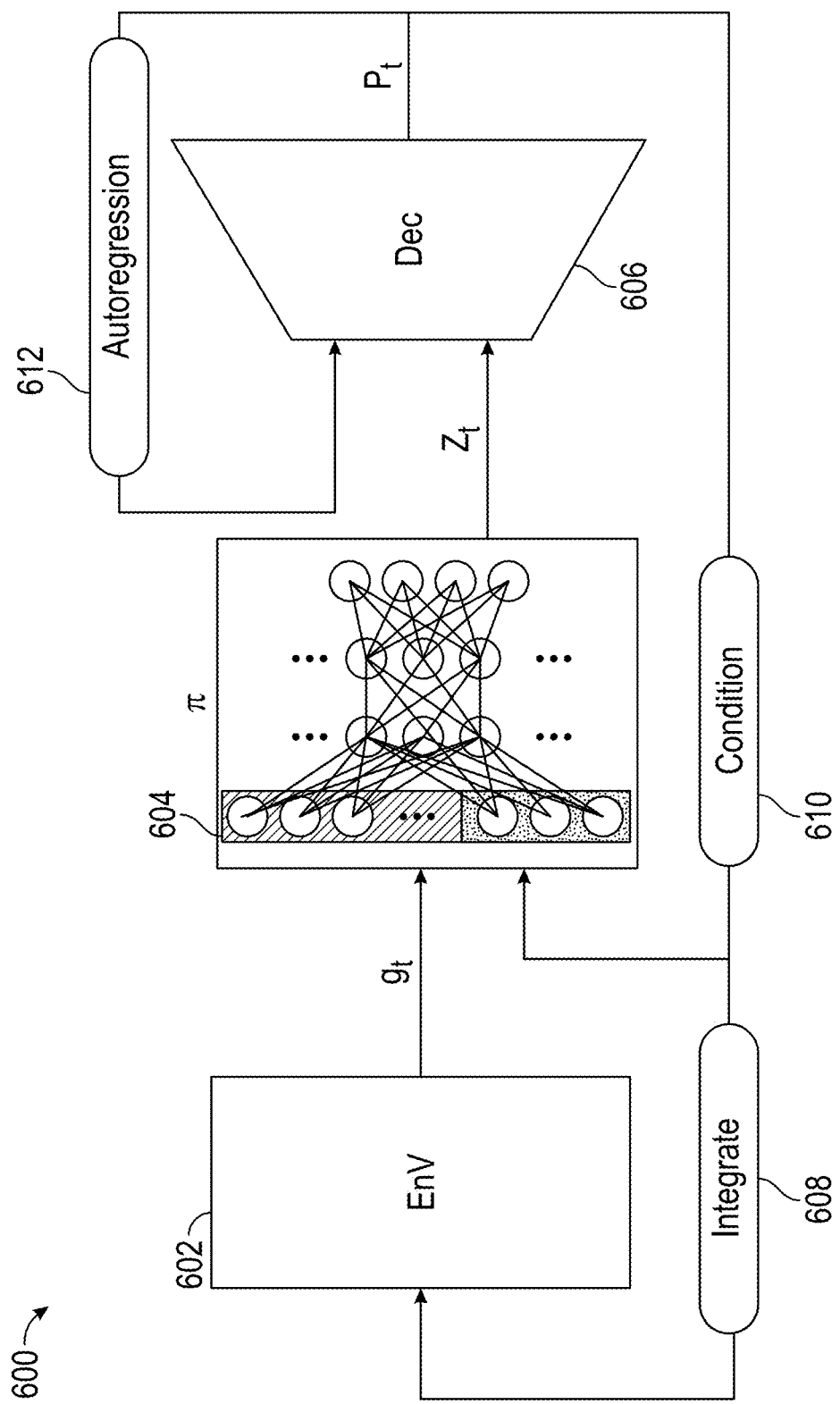
FIG. 6A illustrates a block diagram illustrating an embodiment of using the decoder network at run time.
Figure 6B:
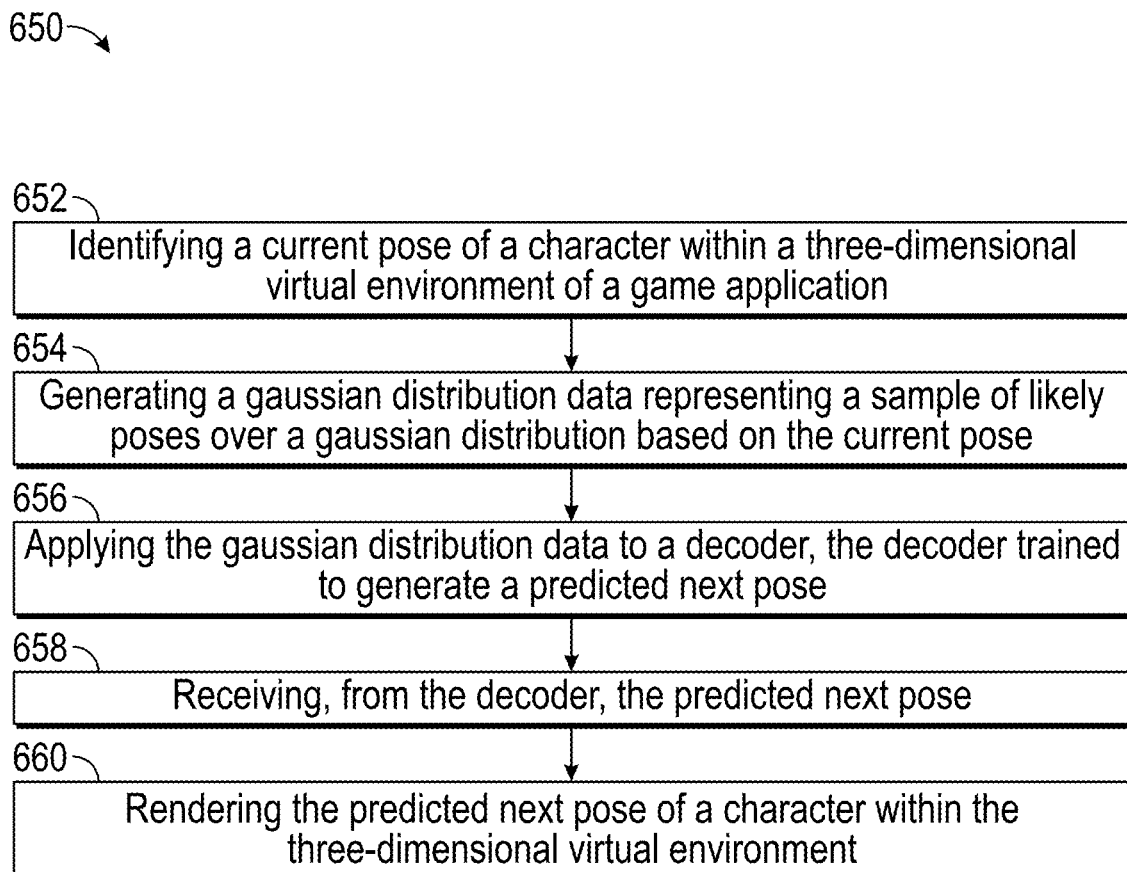
FIG. 6B illustrates a flowchart of an embodiment in the use of the decoder at run time.
Figure 7A:
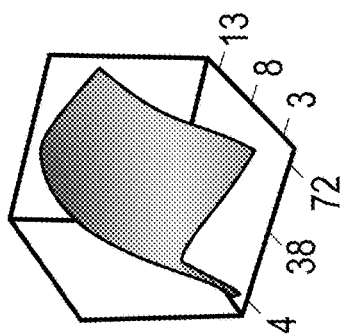
FIGS. 7A-7J illustrate value functions for target locations sampled across the arena and different character initial states.
Figure 7B:
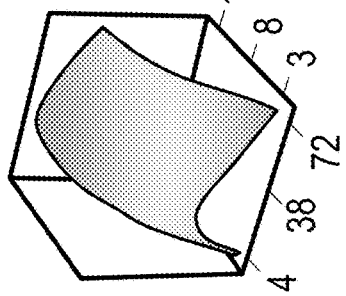
Figure 7C:
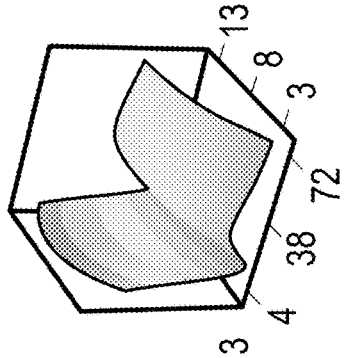
Figure 7D:
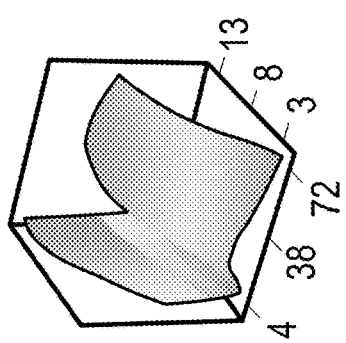
Figure 7E:
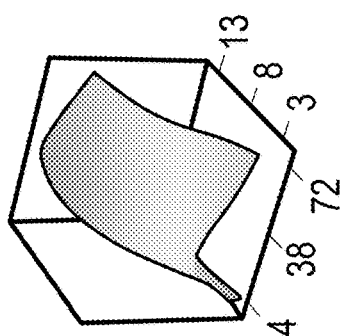
Figure 7F:
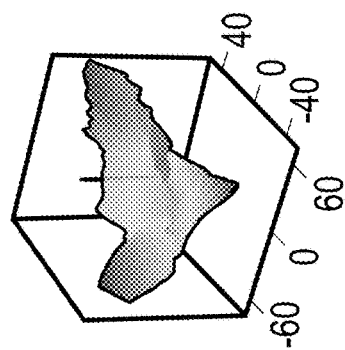
Figure 7G:
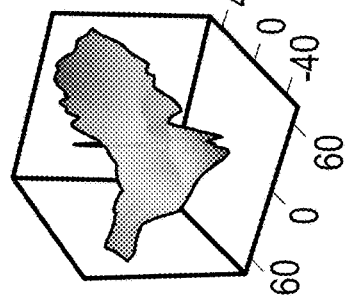
Figure 7H:
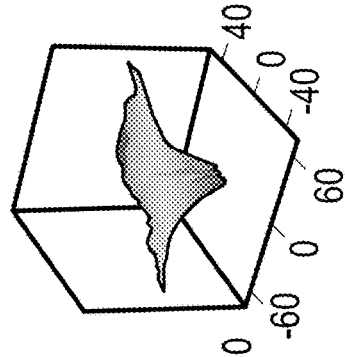
Figure 7I:
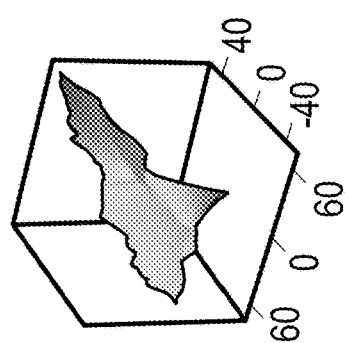
Figure 7J:
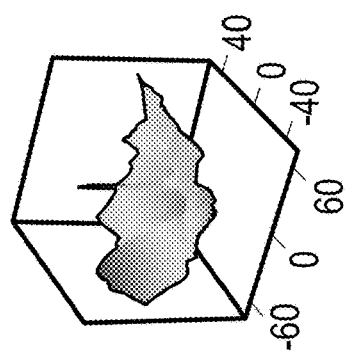

FIG. 6A illustrates a block diagram illustrating an embodiment of using the decoder network at run time. FIG. 6B illustrates a flowchart of an embodiment in the use of the decoder at run time. FIG. 6B illustrates a flowchart of a process 650 in the decoder training process. The process 650 can be implemented by any system that can apply a decoder for predicting a next pose within a game application in a network-based game environment at run time. For example, the process 650, in whole or in part, can be implemented by a pose prediction system, or other computing system. Although any number of systems, in whole or in part, can implement the process 650, to simplify discussion, the process 650 will be described with respect to particular systems. Further, although embodiments of the process 650 may be performed with respect to variations of systems comprising various game application environments, to simplify discussion, the process 650 will be described with respect to the pose prediction system.

In some embodiments, the pose prediction system can apply the trained decoder (e.g., the decoder 210 of FIG. 2A) without the encoder at run time. For example, the decoder 604 of FIG. 6A can be the decoder 210 of FIG. 2A after the decoder has been trained using reinforcement learning.

In some embodiments, the pose prediction system can identify a current pose of a character within a three-dimensional virtual environment of a game application, such as in step 652. The pose prediction system can apply an environment module 602 that can generate a random pose $p_0$ from the motion capture database. The environment uses $p_t$ generated by the decoder to integrate the root positions and computes relevant task information $g_t$. The policy π 604 computes the action from $p_t$ and $g_t$, which is fed as $z_t$ back into the decoder 606. The policy 604 can generate a gaussian distribution data representing a sample of likely poses over a gaussian distribution based on the current pose and/or control signals such as $g_t$, such as in step 654, and apply the gaussian distribution data to a decoder, where the decoder is trained to generate a predicted next pose, such as in step 656. The pose prediction system can then receive from the decoder a predicted next pose, such as in step 658. As such, the pose prediction system can learn a policy to computer the latent variable z at every step to guide the character. The pose prediction system can then render the predicted next pose of a character within the three-dimensional virtual environment, such as in step 660.

In some embodiments, the environment 602 can provide key control signals as to the goals within the game application. For example, a user or an artificial intelligence module may want to navigate a maze or follow a trajectory. The environment 602 provides such goals and environmental signals $g_t$ to the policy 604, and the policy 604 generates a distribution of likely poses based on such information.

Advantageously over systems that only have reinforcement learning without the decoder, the output of the policy 604 is $z_t$, instead of an entire pose formatted data, which is quite high in data dimensionality and very difficult to process. Moreover, the amount of time wasted on joint configurations that are impractical are obviated. Moreover, the decoder can operate without storing training data used to train the decoder. In contrast for motion matching algorithm, the decoder at run time may be gigabytes, whereas the decoder described herein may be just a few megabytes.

Locomotion Controllers—Target Control Signals

In some embodiments, the pose prediction system can include target control signals. The goal for this task is to navigate towards a target that is randomly placed within the bounds of a predefined arena. The character begins in the center of the arena and knows the precise location of the target at any given moment in its root space. Upon reaching the target, a new target location is randomly selected and the cycle starts over again. The character can be determined as having reached the target if its pelvis is within two feet of the target. Furthermore, the size of arena can be defined as 120×80 feet to simulate the fact that soccer pitches are rectangular.

In the context of FIG. 6A, the environment needs to compute the goal $g_t$ and the reward $r_t$ in each time step. The environment keeps track of the root position and root facing of the character, i.e. $\dot{r}_x$, $\dot{r}^y$, and $\dot{r}^a$, in global space. In each time step, the environment first computes the new global state of the character by integrating $\dot{r}^x$, $\dot{r}^y$, and $\dot{r}^a$ in the current pose. The coordinate of the target in character root space is provided to the policy. The reward, r (s, a), is a combination of progress made towards the target and a bonus reward for reaching the target.

The progress term is computed as the change in distance to the target in each step after applying the integration procedure. Upon reaching the target, the policy receives an one-time bonus before a new target is set.

In actor-critic based algorithms a value function is learned alongside the policy. Although at test time the pose prediction system may only need to query the policy to get the action, the value function contains valuable information regarding the limitations of the policy.

FIGS. 7A-7J illustrate value functions for target locations sampled across the arena and different character initial states. FIGS. 7F-7J illustrate the use of a surface plots to show the value function computed if the target is placed at coordinates x, y, corresponding to the left and right axis. Each surface plot shows a different character initialization—From left to right, there is forward sprint, 180° turn, right banking turn, left turn, and resting.

FIGS. 7A-7E illustrate value functions for additional time-variant experiment of the Target task in which the character has limited time to reach the targets. The left axis corresponds to the target distance in feet and right axis to the remaining time in seconds.

In the embodiments of FIGS. 7A-7J, the character is always located at the origin and facing along the x-axis. As shown, the value function peaks at the origin as expected; if the target is also located at the origin, then the character does not need to move at all to receive the target bonus. Moreover, the value function is lower in the vicinity of the character and rises gradually as the target gets further. This means that it is easier and quicker for the policy to navigate the character to targets that are at a certain distance. Considering the data distribution of the original motion capture sequences which mostly contain running motions, this observation is reasonable. Lastly, reasonable value function shapes when the character is initialized to a left or right turn.

In some embodiments, a timed variant of the Target task can be implemented in which the character has limited time to reach the targets. Each of the value function plots in FIGS. 7A-7J contain an inverted parabolic cylinder-like surface, e.g. the expected return is highest at middle distances. Again, this is the combined effect of the progress reward and target bonus. For a fixed time slice, the expected return is low when target is close because the total receivable progress reward, e.g., the potential, is small. Conversely, when the target is beyond reach given the remaining time, the contribution from target bonus is vanishes from the value function.

As discussed above, a trained MVAE model may not always generalize enough to allow the character movement to be controlled. While this is clear when posterior collapse occurs, it can be less obvious if the MVAE still exhibits some generalization. In some embodiments, the pose prediction system can use a straight line running task as a sanity check to determine if the model has enough generalization for learning a controller. This task is a special case of the Target task where the character is initialized to be at the start of a running sequence and the target is placed directly in front of it. By varying the distance between the character and the target, the pose prediction system can test whether the MVAE has sufficient controllability.

Locomotion Controllers—Joystick Control Signals

In some embodiments, the pose prediction system can implement joystick control as another standard locomotion task in animation. The task requires the character to change its heading direction to match the direction of the joystick. In addition, the character should adjust its forward speed proportional to the magnitude of the joystick tilt. A future trajectory can be generated from the joystick and character state at test time.

In some embodiments, the pose prediction system can simulate joystick control by changing the desired direction and speed every 120 and 240 frames respectively. The desired direction ($r_d^a$) is uniformly sampled between 0 and $2\pi$, regardless of the current facing direction. For the desired speed ($\dot{r}_d$), the pose prediction system can uniformly select a value between 0 and 24 feet per second, which is the typical velocity range for a character in the motion capture database. During training, the character receives the following reward in every time step, $$r_{joystick} = e^{cost(r^a - r_d^a) - 1} \times e^{-|\dot{r} - \dot{r}_d|},$$

where r is the current speed of the character. The cosine operator in the first reward term addresses the discontinuity at 0 and $2\pi$ when calculating difference between two angles, while the two exponentials are used to normalize the reward to be between 0 and 1. Multiplying the two reward terms encourages the policy to satisfy both target direction and speed simultaneously. At test time, the user can control the desired heading direction and speed interactively.

Locomotion Controllers—Path Follower

In some embodiments, the pose prediction system can implement a Path Follower task, where the character is required to follow a predefined 2D path as closely as possible. The pose prediction system can implement this task as an extension of the Target task, with the character seeing multiple targets (N=4), each spaced 15 time steps apart, along the predefined path. The pose prediction system can feed the policy N target locations, rather than the entire path, so that it does not memorize the entire trajectory. This way the policy can have a chance to adapt to path variations at run-time without further training.

The pose prediction system can train the policy on a parametric FIG. 8, given by x=A sin (bt) and y=A sin (bt) cos(bt) where t∈[0, 2π], A=50, and b=2. The time step can be discretized into 1200 equal steps. The pose prediction system can choose this particular curve because it contains left and right turns, as well as straight line segments which require the character to adjust its speed in and out of the turns. It is important to note that the targets advance with time, regardless of the current location of the character. Therefore, the policy learns to speed up and slow down to match the progression of the curve, as well as learn to recover if it has deviated from the path. Randomizing the initial position of the character is important, in a way that is analogous to reference state initialization. In addition, the pose prediction system can set the initial orientation of the character to match the direction of the curve. In the absence of this, the policy may never learn the later segments of the path.

Figure 8A:
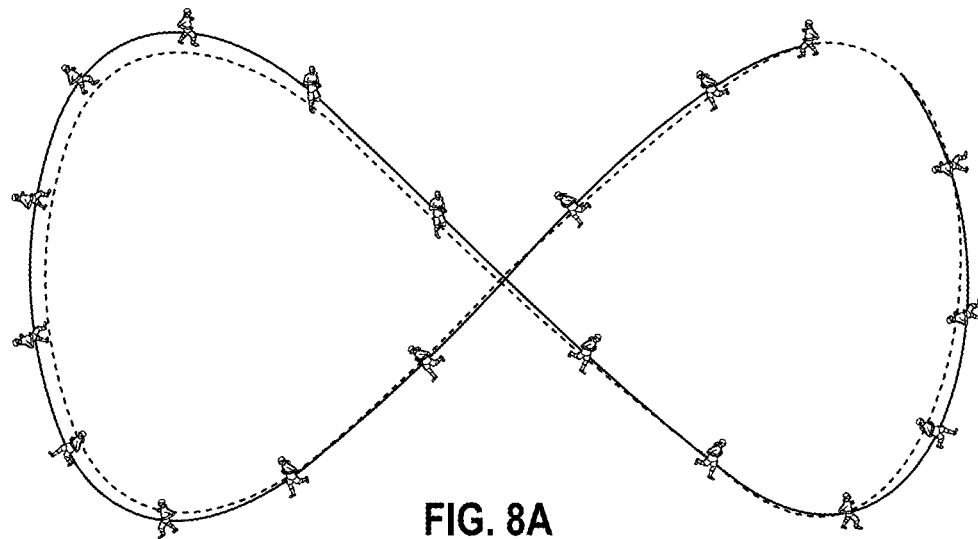
FIGS. 8A-8C illustrate embodiments where the character can generally stick to the path except for a few challenging scenarios.
Figure 8B:
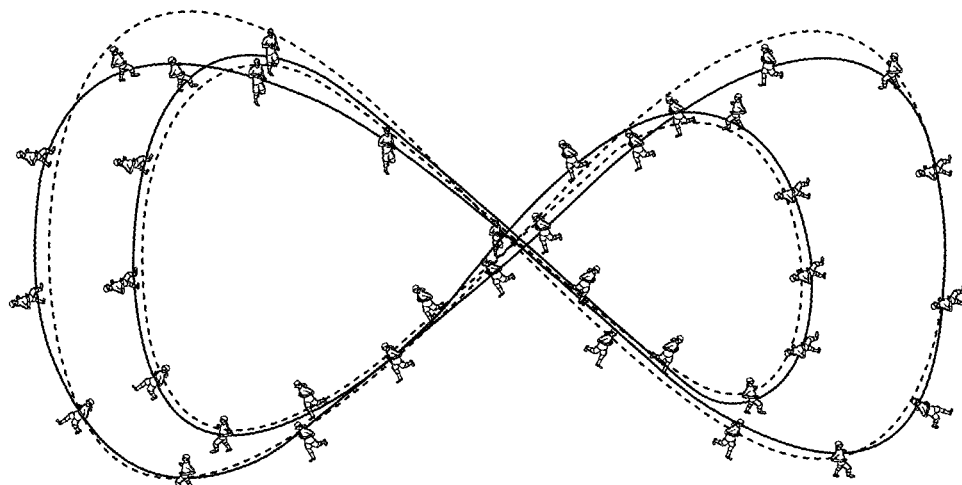
Figure 8C:
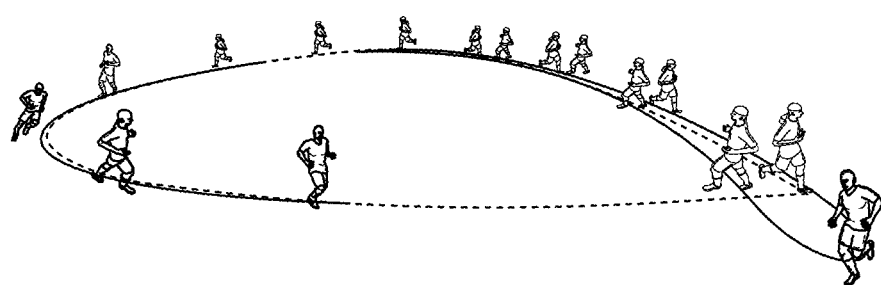

FIGS. 8A-8C illustrate embodiments where the character can generally stick to the path except for a few challenging scenarios. FIG. 8A illustrates a top view of the character root trajectory overlaid on top of a FIG. 8 path. Overall the character is able to match the curve well and remain on target. FIG. 8B illustrates that the policy is able to adapt to new paths with different curvatures and speed requirements. Since the goal for the character is to chase a moving target, the policy exhibits corner-cutting behaviour when the target is moving faster beyond the capability of the character. FIG. 8C illustrates that the policy is unable to find a 180-degree turn, so a small radius looping motion is improvised to keep the character close to the moving target.

Locomotion Controllers—Maze Runner

In some embodiments, the pose prediction system can implement a maze runner task. All previous locomotion tasks have explicit and structured goals in the form of target location and desired direction and velocity. In contrast, the Maze Runner task allows the character to freely explore the space within the confines of a predefined maze. The maze can be fully enclosed without an entrance or exit. The character begins at a random location in the maze and is rewarded for covering as much area as possible.

In some embodiments, the arena is a square of 160×160 feet and the total allotted time is 1500 steps. For simplicity, the pose prediction system can define an exploration reward by dividing the maze into 32×32 equal sectors. Each time the character enters a new sector, it receives a small bonus. The exploration reward can be viewed as a bias for encouraging the policy to be in constant motion, without explicitly specifying how the character should move. The task is terminated immediately when the character hits any of the walls, or when the allotted time is exhausted. Rather than receiving explicit target locations, the character uses a simple vision system to navigate in the environment. The vision system involves casting 16 light rays centered around the current facing direction. Each light ray is encoded by a single floating-point number, which represents the distance to the wall, up to a maximum distance of 50 feet. Note that the character is unaware of its current position in the global space, therefore it must rely on its simple vision system to avoid obstacles.

Figure 9A:
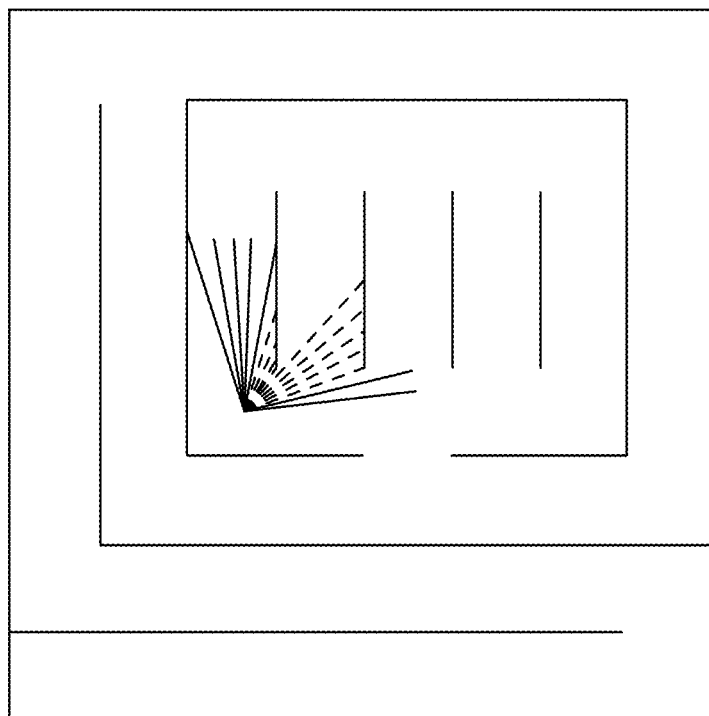
FIGS. 9A-9B illustrate that, with the exploration reward, the policy learns a non-stationary solution and is capable of avoiding walls using the vision system.
Figure 9B:
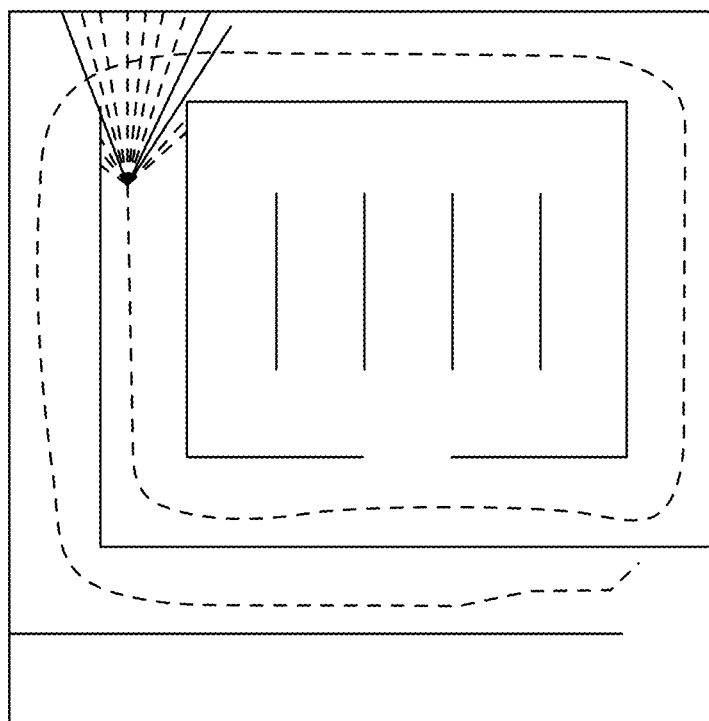
Figure 10A:
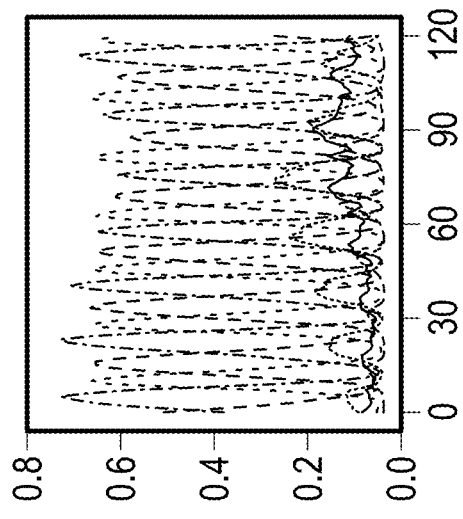
FIGS. 10A-10K illustrate that the blending coefficients exhibit clear sinusoidal patterns and that each expert is utilized approximately equally.
Figure 10B:
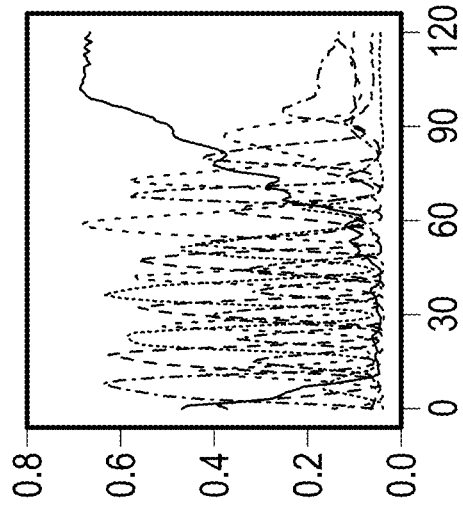
Figure 10C:
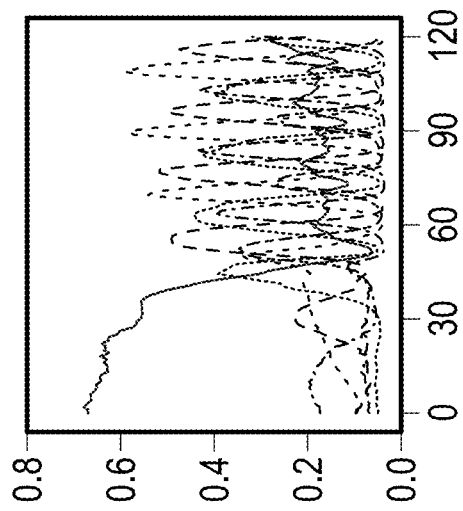
Figure 10D:
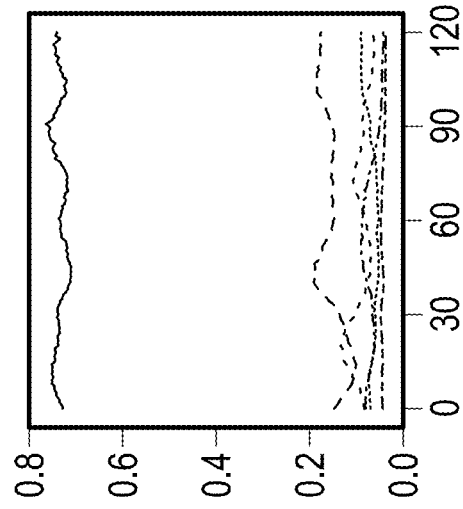
Figure 10E:
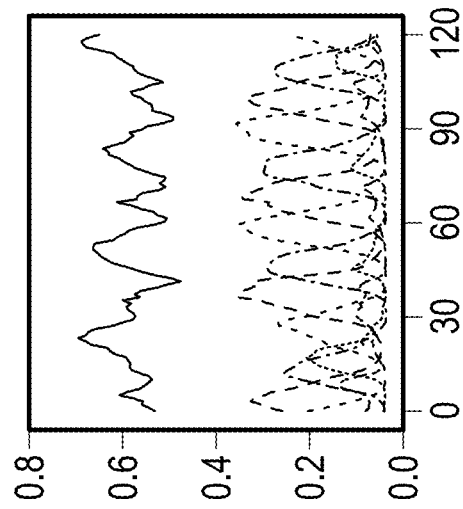
Figure 10F:
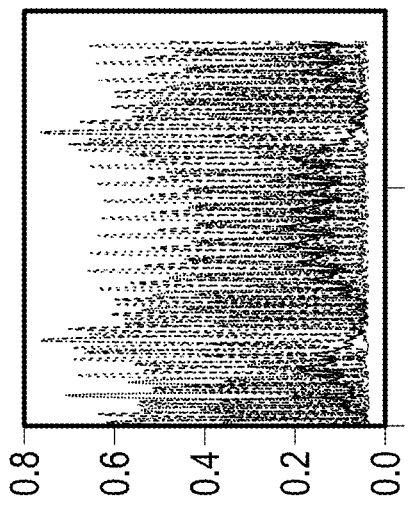
Figure 10G:
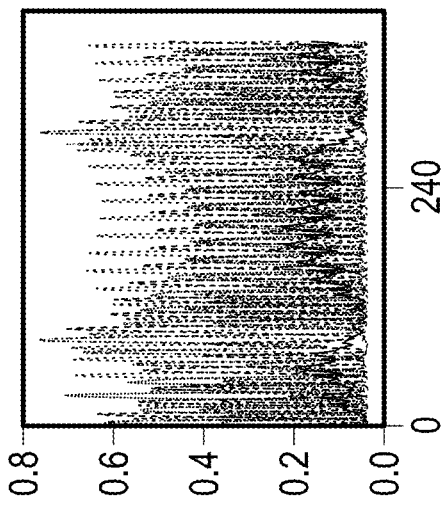
Figure 10H:
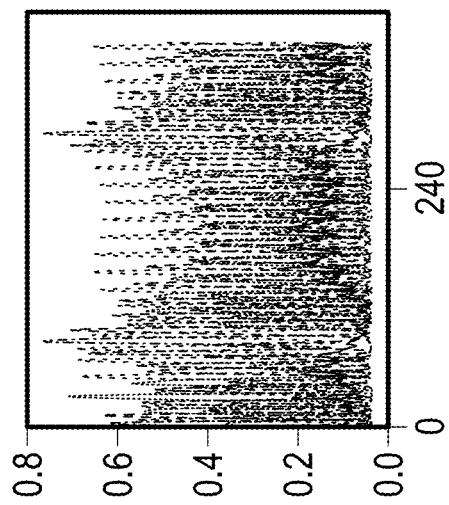
Figure 10I:
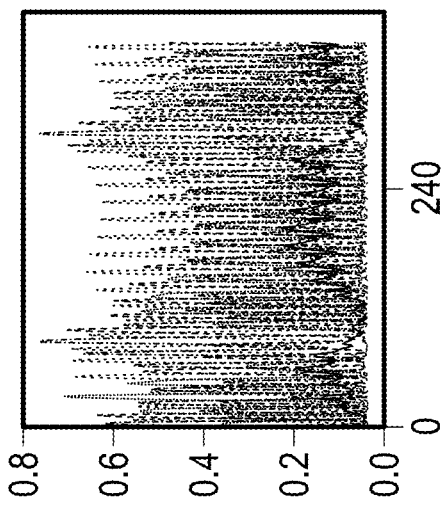
Figure 10J:
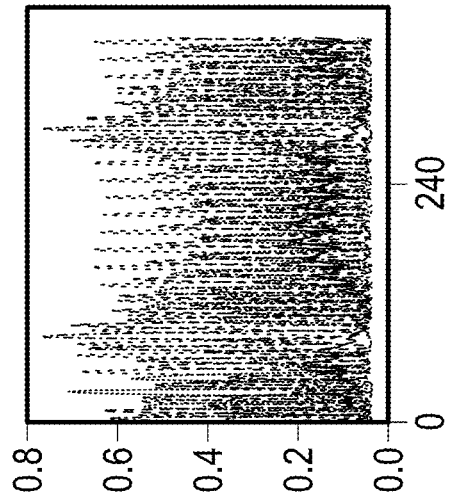
Figure 10K:
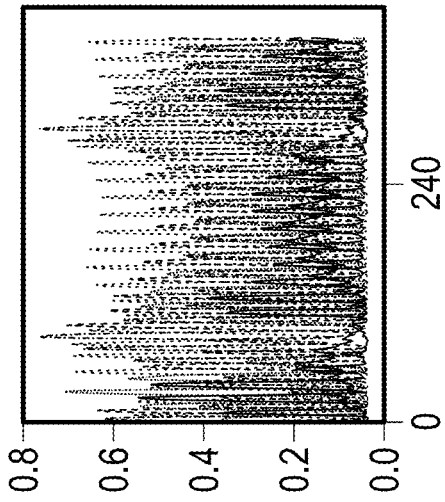

FIGS. 9A-9B illustrate that, with the exploration reward, the policy learns a non-stationary solution and is capable of avoiding walls using the vision system. The maze runner environment requires the character to explore within the maze as much as possible. FIG. 9B illustrates a vision system that includes 16 rays; each encodes a distance to the nearest wall, up to a maximum distance of 50 feet. FIG. 9B illustrates that a character can be initialized anywhere within the maze. The dotted line path traces the progress made by the character thus far in the current episode.

In some embodiments, the pose prediction system can train a high-level controller (HLC) on top of a pre-trained low-level controller (LLC) for the Target task. The HLC outputs a target location at each time step, which is consumed by the LLC to compute an action. Since both HLC and LLC operate at the same control frequency, this suggests that the hierarchical approach may be unnecessary given better fine-tuning of a single policy network.

Patterns in the Gating Network

FIGS. 10A-10K illustrate that the blending coefficients exhibit clear sinusoidal patterns and that each expert is utilized approximately equally. FIGS. 10A-10E include a visualization of blending coefficients under random walk starting from various initial poses. The initial poses, from left to right, correspond to FIGS. 7F-7J. FIGS. 10F-10K visualize expert utility under policy control in Target task. From left to right, each figure highlights the blending coefficient of the corresponding expert.

In the random walk scenario, the pose prediction system can visualize the blending coefficients when the character is performing different actions, i.e. sprinting, 180° turn, right banking turn, left turn, and resting. In the sprinting motion a clear transition is shown from the preparation phase into a run cycle, even just by looking at the expert utility plot. For the resting motion, the non-periodic nature of the curves is consistent with the acyclic nature of the motion.

Another pattern emerges when expert activation under policy control is visualized when solving the Target task. The blending coefficients are plotted on a larger time scale in FIGS. 10F-10K. Each expert activation curve resembles a high frequency sinusoidal signal enveloped by a low frequency signal. The peaks and troughs are identified of the high frequency oscillation to be consistent with the foot strike timing. Furthermore, the low frequency envelope corresponds to the overall character motion. The emergence of these structures means that the MVAE not only learned to reconstruct the character pose, but was also able to infer locomotion features such as foot contact. This observation opens a promising approach to learn character motion. If during training of the MVAE and the policy the pose prediction system can manipulate the underlying signal, such as making the transitions sharper or the period longer, then the pose prediction system can achieve more efficient learning and higher quality motions.

In some embodiments, the pose prediction system can use the MoE decoder model because the model can produce higher motion quality with less visible artifacts. In other embodiments, the pose prediction system can a non-mixture model.

Figure 11:
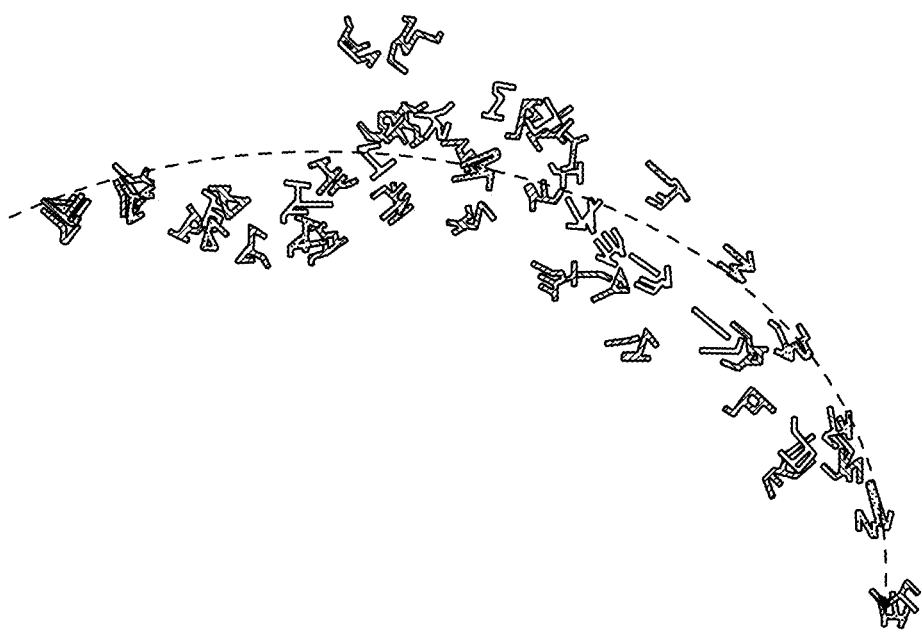
FIG. 11 illustrates the variation between individual characters, while they all still roughly following the path.

One advantage of having an explicit pose transition model in MVAE is that the pose prediction system can easily sample for plausible transitions given the current pose. The random walk and simple sampling-based control can be achieved this way. Similarly, even after training, the pose prediction system can create plausible variations by sampling around the output of the trained policy. Specifically, motion variations can be achieved by adding a small amount of noise to the action at run-time. As the impact of the noise accumulates over time, the trajectories of the simulated characters become visibly distinguishable from one another. To demonstrate the effect, the pose prediction system can simultaneously simulate multiple characters in the Path Follower task. The pose prediction system can set the characters to have the same initial root position and pose. Since the target progression is the same for all characters, the variations are result of the added noise at run-time. FIG. 11 illustrates the variation between individual characters, while they all still roughly following the path. It is possible to generate a variety of motions while still satisfying the overall objective. FIG. 11 illustrates a simulation of four characters with the same initial condition and with the same path following control policy, but the selection of random actions has a probability of 0.2 at each time step. The controllers are exposed to noise during the exploration stage of RL, and so the characters can recover even if the path deviates at run-time.

In some embodiments, the learned task controllers can exhibit a slight preference for right-handedness, despite the motion capture database being left-right balanced. The handedness bias emerges from exploration and exploitation during training. A policy in training may first discover, by chance, that the right-hand turn motion achieves a higher than average reward in some situations. The probability of sampling this motion is subsequently increased due to the higher return, which leads to lower probability of performing a left-hand turn. In physics-based animations, a typical solution is to enforce symmetry during training of the controllers. However, the symmetry enforcement methods all require the action mirror function to be defined, which is undefined for the uninterpretable latent action space in embodiments described herein.

Overview of Computing Device

Figure 12:
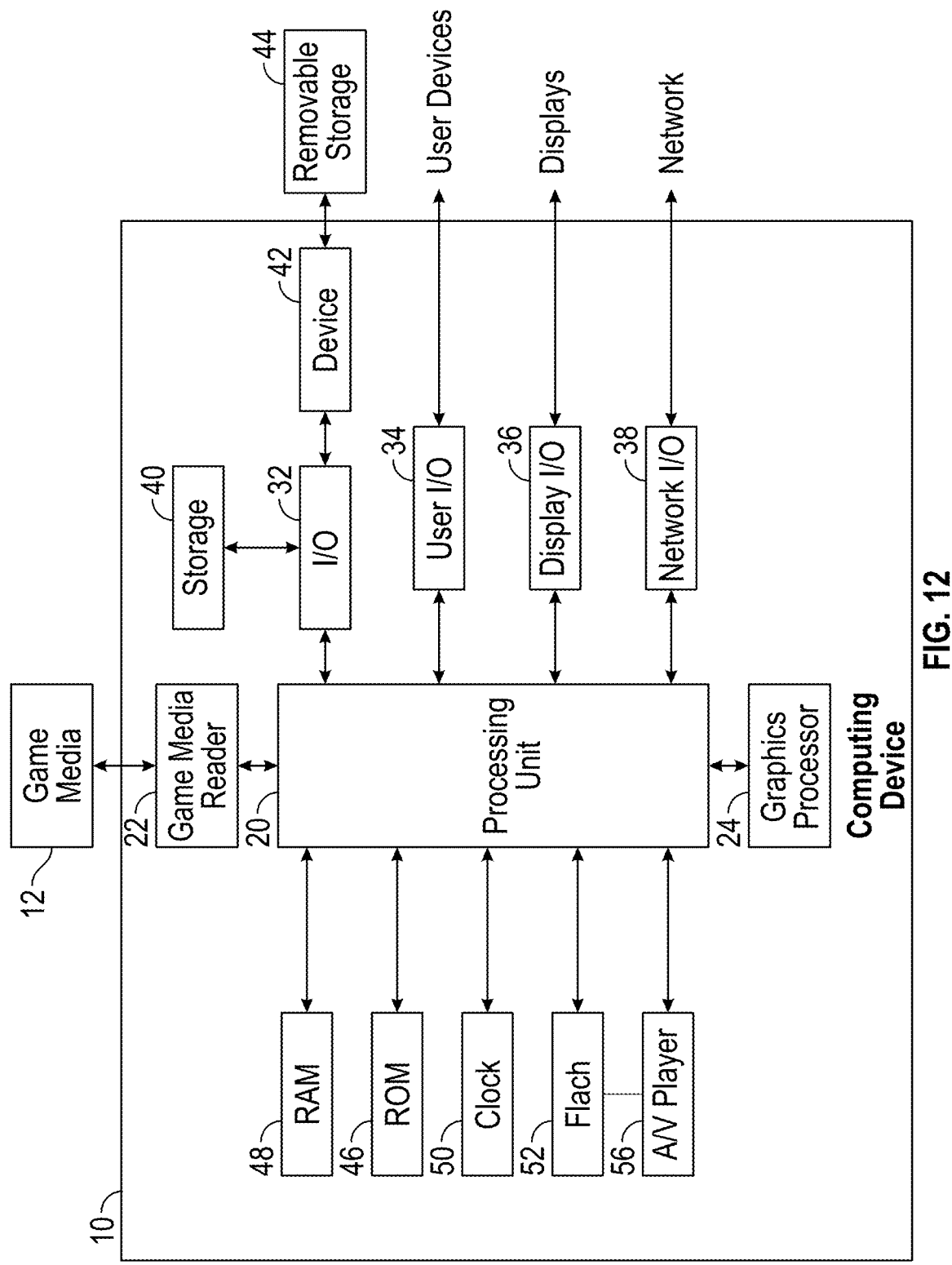
FIG. 12 illustrates an embodiment of a computing device.

FIG. 12 illustrates an embodiment of computing device 10. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the terrain generation is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of terrain generation, and/or generation of a biome model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method for predicting a next pose of a character within a three-dimensional virtual gaming environment, wherein the method includes:
    identifying a current pose of a character within a three-dimensional virtual environment of a game application;
    generating a gaussian distribution data representing a sample of likely poses over a gaussian distribution based on the current pose;
    applying the gaussian distribution data to a decoder, the decoder trained to generate a predicted next pose;
    receiving, from the decoder, the predicted next pose, wherein during use of the decoder, input motion capture data used to train the decoder is not stored in memory; and
    rendering the predicted next pose of a character within the three-dimensional virtual gaming environment.

2. The method of claim 1, wherein the predicted next pose is generated by the decoder without using input motion capture data that was applied during training of the decoder.

3. The method of claim 1, wherein input to the decoder does not include root motion path, wherein root motion path includes a trajectory of the character in a first time period and a second time period.

4. The method of claim 1, further comprising identifying an environmental characteristic within a three-dimensional virtual environment, the environmental characteristic includes a goal for the character, wherein the decoder is trained to generate a predicted next pose for the goal.

5. The method of claim 4, wherein the goal is an end location of the character.

6. The method of claim 4, wherein the goal is a desired trajectory of the character.

7. The method of claim 4, wherein the environmental characteristic is inputted into the decoder for receiving the predicted next pose.

8. The method of claim 7, wherein environmental characteristics are not used in training the decoder.

9. The method of claim 1, wherein the game application includes a maze runner.

10. The method of claim 1, wherein the predicted next pose comprises pose data including at least one of: joint angles of the character, trajectory information, or joint rotation information.

11. The method of claim 1, wherein the gaussian distribution comprises a mean and standard deviation.

12. The method of claim 1, wherein applying the gaussian distribution comprises sampling the gaussian distribution to determine a latent variable.

13. The method of claim 1, wherein the sample of likely poses comprise a sample of valid poses from the current pose of the character.

14. A system for training a decoder to predict a next pose of a character within a three-dimensional virtual gaming environment, wherein the system includes:
    one memory; and
    one or more processors configured to:
        input, to an encoder, a current pose and a next pose from motion capture data;

receive, from the encoder, a gaussian distribution representing likely next poses from the current pose;

input, to a decoder, the gaussian distribution and the next pose;

receive, from the decoder, a predicted next pose, wherein during use of the decoder, input motion capture data used to train the decoder is not stored in memory;

compare the next pose with the predicted next pose to generate a loss function; and apply a reward function based on the comparison of the actual next pose with the predicted next pose to perform reinforcement learning to train the decoder to predict next poses of characters in a virtual gaming environment based on a current pose and an environmental characteristic.

15. The system of claim 14, wherein a dimensionality of the output of the encoder is the same as the input of the decoder.

16. The system of claim 15, wherein the dimensionality is a 32 long latent variable.

17. The system of claim 15, wherein the environmental characteristic includes a goal for the character, wherein the decoder is trained to generate a predicted next pose for the goal.

18. The system of claim 14, wherein the predicted next pose is generated by the decoder without using input motion capture data that was applied during training of the decoder.

* * * * *